United States Patent
Li et al.

(10) Patent No.: US 10,127,135 B2
(45) Date of Patent: Nov. 13, 2018

(54) SYSTEMS AND METHODS FOR INCREMENTAL ANALYSIS OF SOFTWARE

(71) Applicant: Synopsys, Inc., Mountain View, CA (US)

(72) Inventors: Guodong Li, San Jose, CA (US); John Steven, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/249,300

(22) Filed: Aug. 26, 2016

(65) Prior Publication Data

US 2017/0329693 A1 Nov. 16, 2017

Related U.S. Application Data

(60) Provisional application No. 62/335,619, filed on May 12, 2016.

(51) Int. Cl.
*G06F 11/36* (2006.01)

(52) U.S. Cl.
CPC ...... *G06F 11/3608* (2013.01); *G06F 11/3604* (2013.01); *G06F 11/3668* (2013.01)

(58) Field of Classification Search
CPC ............. G06F 17/30976; G06F 21/577; G06F 2221/033; G06F 11/36; G06F 11/3604; G06F 11/3608; G06F 11/362
USPC .................................................. 717/124–135
See application file for complete search history.

(56) References Cited

U.S. PATENT DOCUMENTS

| 5,854,924 A | 12/1998 | Rickel et al. |
| 7,673,295 B1 * | 3/2010 | Lin .......................... G06F 8/445 717/119 |
| 7,752,609 B2 | 7/2010 | Rioux |

(Continued)

OTHER PUBLICATIONS

Engler D., Musuvathi M. (2004) Static Analysis versus Software Model Checking for Bug Finding. In: Steffen B., Levi G. (eds) Verification, Model Checking, and Abstract Interpretation. VMCAI 2004. Lecture Notes in Computer Science, vol. 2937. Springer, Berlin, Heidelberg (Year: 2004).*

(Continued)

*Primary Examiner* — Andrew M. Lyons
(74) *Attorney, Agent, or Firm* — Sterne, Kessler, Goldstein & Fox P.L.L.C.

(57) ABSTRACT

Systems and methods for software verification. In some embodiments, a first application architecture model is generated for a software application, wherein: the first application architecture model is generated based on a first version of source code of the software application; and the first application architecture model comprises a plurality of component models. A second version of source code may be compared against the first version of source code to determine at least one difference. At least one affected component model of the first application architecture model may be identified based on the at least one difference. A second application architecture model may be generated based on the second version of source code, wherein generating the second application architecture model comprises generating an updated version of the at least one affected component model.

12 Claims, 27 Drawing Sheets

(56) References Cited

U.S. PATENT DOCUMENTS

| | | | | |
|---|---|---|---|---|
| 7,813,911 | B2* | 10/2010 | Triou, Jr. | G06F 11/3676 703/22 |
| 8,209,646 | B2* | 6/2012 | Chess | G06F 11/3608 716/106 |
| 8,646,087 | B2* | 2/2014 | Pistola | G06F 21/57 717/127 |
| 8,671,396 | B2* | 3/2014 | Wu | G06F 11/3608 717/124 |
| 8,719,770 | B2* | 5/2014 | Balani | G06F 8/20 717/104 |
| 8,732,669 | B2* | 5/2014 | Valdiviezo Basauri | G06F 11/3608 717/104 |
| 8,949,772 | B1* | 2/2015 | Talby | G06F 8/35 714/38.14 |
| 9,552,276 | B1* | 1/2017 | Hale | G06F 8/433 |
| 2002/0198873 | A1* | 12/2002 | Chu-Carroll | G06F 17/30445 |
| 2004/0054991 | A1* | 3/2004 | Harres | G06F 11/3664 717/131 |
| 2004/0205742 | A1* | 10/2004 | Das | G06F 8/433 717/155 |
| 2006/0253840 | A1* | 11/2006 | Cruickshank | G06F 11/3447 717/127 |
| 2007/0055558 | A1* | 3/2007 | Shanahan | G06Q 10/06 705/7.26 |
| 2007/0143680 | A1* | 6/2007 | Cowan | G06Q 10/107 715/713 |
| 2007/0143742 | A1* | 6/2007 | Kahlon | G06F 8/74 717/124 |
| 2007/0168992 | A1* | 7/2007 | Bates | G06F 11/3636 717/128 |
| 2007/0234288 | A1* | 10/2007 | Lindsey | G06F 8/437 717/117 |
| 2007/0240138 | A1 | 10/2007 | Chess et al. | |
| 2007/0277163 | A1* | 11/2007 | Avresky | G06F 8/43 717/140 |
| 2008/0178161 | A1* | 7/2008 | Cates | G06F 11/3612 717/133 |
| 2009/0307664 | A1* | 12/2009 | Huuck | G06F 11/3608 717/124 |
| 2010/0083240 | A1* | 4/2010 | Siman | G06F 8/433 717/144 |
| 2011/0197180 | A1 | 8/2011 | Huang et al. | |
| 2011/0283260 | A1* | 11/2011 | Bucuvalas | G06F 11/3664 717/124 |
| 2011/0295578 | A1* | 12/2011 | Aldrich | G06F 8/10 703/6 |
| 2013/0179863 | A1* | 7/2013 | Vangala | G06F 8/74 717/124 |
| 2013/0239219 | A1* | 9/2013 | Siman | G06F 21/577 726/25 |
| 2014/0096112 | A1* | 4/2014 | DeLine | G06F 8/75 717/125 |
| 2014/0130020 | A1 | 5/2014 | Boshernitsan et al. | |
| 2014/0173559 | A1* | 6/2014 | Tiwari | G06F 8/71 717/122 |
| 2014/0229922 | A1* | 8/2014 | Valdiviezo Basauri | G06F 8/41 717/126 |
| 2014/0331202 | A1* | 11/2014 | Fukuda | G06F 8/75 717/123 |
| 2015/0363294 | A1* | 12/2015 | Carback, III | G06F 8/37 717/132 |
| 2017/0031806 | A1* | 2/2017 | Purandare | G06F 11/3608 |
| 2017/0139678 | A1* | 5/2017 | Funakoshi | G06F 8/10 |

OTHER PUBLICATIONS

Vorobyov, Kostyantyn & Krishnan, Padmanabhan. (2010). Comparing Model Checking and Static Program Analysis: A Case Study in Error Detection Approaches. (Year: 2010).*

Wikipedia, "Model checking," Apr. 7, 2016, last retrieved from https://en.wikipedia.org/w/index.php?title=Model_checking&oldid=714049525 on Jun. 11, 2018. (Year: 2016).*

Wikipedia, "Static program analysis," May 11, 2015, last retrieved from https://en.wikipedia.org/w/index.php?title=Static_program_analysis&oldid=661872239 on Jun. 11, 2018. (Year: 2015).*

International Search Report and Written Opinion for International Application No. PCT/US16/49120 dated Dec. 9, 2016.

[No Author Listed], Application Security Testing. Hewlett Packard Enterprise. http://www8.hp.com/us/en/software-solutions/application-security-testing/index.html Last accessed: Apr. 12, 2017. 3 pages.

[No Author Listed], ECMA. Standard ecma-335: Common language infrastructure (cli). http://www.ecma-international.org/publications/standards/Ecma-335.htm Jun. 2012.

[No Author Listed], Fix Insecure Code on-the-fly, without slowing you down. SecureAssist. Codiscope. https://codiscope.com/products/secureassist/ Last accessed: Apr. 12, 2017. 2 pages.

[No Author Listed], NVD CVSS Support. Computer Security Resource Center. National Vulnerability Database. https://nvd.nist.gov/vuln-metrics/cvss Last accessed: Apr. 12, 2017. 3 pages.

[No Author Listed], Our Vision—Make Developers Choose Security. Checkmarx. https://www.checkmarx.com/about-us/ Last accessed: Apr. 12, 2017. 2 pages.

[No Author Listed], Property Specification Language (PSL). Reference Manual. Version 1.1 Jun. 9, 2004. 131 pages.

[No Author Listed], Static and dynamic application security testing throughout the application lifecycle. IBM Security AppScan. IBM. http://www-03.ibm.com/software/products/en/appscan Last accessed: Apr. 12, 2017. 3 pages.

[No Author Listed], The Father of Decompilation. Program-Transformation.Org: The Program Transformation Wiki. http://www.program-transformation.org/Transform/FatherOfDecompilation 1998. Last accessed: Apr. 12, 2017. 3 pages.

Anderson et al., Design and Implementation of a Fine-Grained Software Inspection Tool. IEEE Trans. Software Eng. 2003;29(8):721-33.

Bala et al., Dynamo: a transparent dynamic optimization system. Proceedings of the ACM SIGPLAN 2000 Conference on Programming Language Design and Implementation. 2000;1-12.

Balakrishnan et al., CodeSurfer/x86—A Platform for Analyzing x86 Executables. Proceedings of the 14th International Conference on Compiler Construction. 2005;250-4.

Bergh et al., HP-3000 Emulation on HP Precision Architecture Computers. Hewlett-Packard Journal. 1987;38(11):87-9.

Borg et al., Long address traces from risc machines: Generation and analysis. Technical report, Digital Equipment Corporation Western Research Laboratory. 1989.

Brumley et al., BAP: A Binary Analysis Platform. Computer Aided Verification. 2011;6806:463-9.

Brumley et al., Native x86 Decompilation Using Semantics-Preserving Structural Analysis and Iterative Control-Flow Structuring. Presented as part of the 22nd USENIX Security Symposium. 2013;353-68.

Cifuentes et al., Computer Security Analysis through Decompilation and High-Level Debugging. Reverse Engineering, 2001. Proceedings. Eight Working Conference. 2001. 6 pages.

Cifuentes et al., Decompilation of Binary Programs. Software: Practice and Experience. 1995;25(7):811-29.

Cifuentes, Interprocedural data flow decompilation. Technical report, University of Queensland, Australia. 1996. 19 pages.

Cifuentes, Reverse compilation techniques. PhD thesis, Queensland University of Technology. 1994. 342 pages.

Cifuentes, Structuring decompiled graphs. Technical report, University of Queensland, Australia. 1996. 15 pages.

Cousot et al., Abstract Interpretation: A Unified Lattice Model for Static Analysis of Programs by Construction or Approximation of Fixpoints. Proceedings of the 4th ACM SIGACT-SIGPLAN Symposium on Principles of Programming Languages. 1977. 16 pages.

De Sutter et al., on the static analysis of indirect control transfers in binaries. Proceedings of the International Conference on Parallel and Distributed Processing Techniques and Applications. 2000. 7 pages.

(56) References Cited

OTHER PUBLICATIONS

Debray et al., Alias Analysis of Executable Code. Proceedings of the 2th ACM SIGPLAN-SIGACT Symposium on Principles of Programming Languages. 1998. 13 pages.
Ferrante et al., The Program Dependence Graph and Its Use in Optimization. ACM Trans. Program. Lang. System. 1987;9(3):319-49.
Halstead, Machine-Independent Computer Programming. Spartan Books. Washington, D.C. 1962. 282 pages.
Hastings et al., Purify: Fast detection of memory leaks and access errors. Proc. of the Winter 1992 USENIX Conference. 1991;125-36.
Hollingsworth et al., Dynamic program instrumentation for scalable performance tools. Proceedings of the Scalable High-Performance Computing Conference. 1994. 10 pages.
Holzmann, Software model checking (SMC). Last accessed Apr. 12, 2017. 42 pages.
Horwitz et al., Interprocedural slicing using dependence graphs. Proceedings of the ACM SIGPLAN 1988 Conference on Programming Language Design and Implementation. 1990;12(1):1-35.
Housel et al., A methodology for machine language decompilation. Proceedings of the 1974 Annual Conference—vol. 1, ACM. 1974;254-60.
Housel, A Study of Decompiling Machine Language into High-Level Machine Independent Languages. PhD thesis, West Lafayette, IN. 1973. AAI7404980. 274 pages.
Hovemeyer et al., Finding bugs is easy. Companion to the 19th Annual ACM SIGPLAN Conference on Object-oriented Programming Systems, Languages, and Applications, OOPSLA. 2004. 12 pages.
Johnson et al., Effectiveness of a machine-level, global optimizer. Proceedings of the 1986 SIGPLAN Symposium on Compiler Construction, SIGPLAN. 1986;99-108.
Kildall, A unified approach to global program optimization. Proceedings of the 1th Annual ACM SIGACT-SIGPLAN Symposium on Principle of Prgramming Languages. 1973. 14 pages.
Larus et al., Eel: Machine-independent executable editing. Proceedings of the ACM SIGPLAN 1995 Conference on Programming Language Design and Implementation. 1995. 10 pages.
Larus et al., Rewriting executable files to measure program behavior. Softw. Pract. Exper. 1994;24(2)197-218.
Lattner, LLVM: An Infrastructure for Multi-Stage Optimization. Master's thesis, Computer Science Dept., University of Illinois at Urbana-Champaign. 2002. 34 pages.

Lindholm et al., The java® Virtual Machine Specification: Java SE 7 edition. Feb. 28, 2013. 606 pages.
Martin et al., Finding application errors and security flaws using PQL: a program query language. OOPSLA. Proceedings of the 20th annual ACM SIGPLAN conference on Object-oriented programming, systems, languages, and applications. 2005. 18 pages.
Miller et al., The paradyn parallel performance measurement tool. Computer. 1995;28(11):37-46.
Muth et al., Alto: A link-time optimizer for the Compaq alpha. Technical report, University of Arizona. 1998. 31 pages.
Nethercote et al., Valgrind: A framework for heavyweight dynamic binary instrumentation. Proceedings of the 2007 ACM SIGPLAN Conference on Programming Language Design and Implementation, 2007;89-100.
Nethercote et al., Valgrind: A program supervision framework. Third Workshop on Runtime Verification. 2003. 23 pages.
Pierce et al., Idtrace—a tracing tool for i486 simulation. Technical report, University of Michigan, Ann Arbor, MI. Mar. 1994. 25 pages.
Ravipati et al., Towards the deconstruction of dyninst. Technical report, UW Madison, Madison, WI, Jun. 2007. 9 pages.
Rosenblum et al., Complete computer system simulation: the simos approach. Parallel Distributed Technology: Systems Applications, IEEE. 1995;3(4):34-43.
Sites et al., Binary translation. Commun. ACM. 1993;36(2)69-81.
Song et al., Bitblaze: A new approach to computer security via binary analysis. Proceedings of the 4th International Conference on Information Systems Security. 2008;1-25.
Srivastava et al., A practical system for intermodule code optimization at link-time.Technical report, DEC Western Research Laboratory. 1992.
Srivastava et al., Atom: A system for building customized program analysis tools. Proceedings of the ACM SIGPLAN 1994 Conference on Programming Language Design and Implementation. 1994;196-205.
Stephens et al., Instruction level profiling and evaluation of the ibm rs/6000. Computer Architecture, 1991. The 18th Annual International Symposium. 1991;180-9.
Wall et al., The Mahler experience: Using an intermediate language as the machine description Technical report, Digital Equipment Corporation Western Research Laboratory. 1987. 18 pages.
Witchel et al., Embra: Fast and flexible machine simulation. Proceedings of the 1996 ACM SIGMETRICS International Conference on Measurement and Modeling of Computer Systems. SIGMETRICS. 1996. 12 pages.

\* cited by examiner

FIG. 4

```
// Java Source Program using SpringMVC framework          — 400 public class sql1 extends SequentialLessonAdapter
{
    private String accountName;                            — 405

@RequestMapping(value = "/database", method = "get")   — 410
    protected Element injectableQuery(WebSession s) {      — 415
        ...
        Connection connection = DatabaseUtilities.getConnection(s);
        accountName = s.getParser().getRawParameter(ACCT_NAME, "Your Name");
        String query = "SELECT * FROM user_data WHERE last_name = '" + accountName + "'";
        Statement statement = connection.createStatement(...);
        ResultSet results = statement.executeQuery(query);
        ...
    }
}
```

```
// Discovery query for SpringMVC routes:                  — 420
PERFORM
    _model.routes[$1][$2].callbacks = [ $# 
];
WHEN
    <( @RequestMapping(value = $1, method
        = $2)
        $#
    )>
```

```
// resulting model:                                       — 435
_model.routes["/database"]["get"].callbacks
    = [ injectableQuery ];
```

```
// Java Source Program
protected Element injectableQuery(WebSession s) {
    ...;
    Connection connection = DatabaseUtilities.getConnection(s);

accountName = s.getParser().getRawParameter(ACCT_NAME, "Your
Name");

String query = "SELECT * FROM user_data WHERE last_name = '" +
accountName + "'";

Statement statement = connection.createStatement(...);

ResultSet results = statement.executeQuery(query);
}
```

```
// query 1
PERFORM $x.tainted = true
WHEN <{ $x = getStringParameter() OR
getRawParameter() }>;

// query 2
MATCH <{ $o.$f($1) }>
WHERE
    $o instanceof java.sql.Statement AND
    $f.ast.name.match(/execute.*/) AND
    $1.tainted == true
REWRITE
    $1 <= API.sanitize($1)
```

FIG. 5

| | | |
|---|---|---|
| <query> | ::= | <syntax matching block> |
| | \| | <flow statement> |
| | \| | <semantics predicate> |
| | \| | <side-effect predicate> |
| | \| | <module statement> |
| <syntax matching block> | ::= | <{ <source syntax> }> WHERE <semantics predicate> |
| | \| | MATCH: <syntax matching block> |
| <source syntax> | ::= | <source program> \| <source program> <syntax operator> <source syntax> |
| <syntax operator> | ::= | OR \| FIRST \| LAST \| NEXT |
| <flow statement> | ::= | <syntax matching block> <flow operator> <syntax matching block> |
| | \| | <syntax matching block> <flow operator> <flow operator> <flow statement> |
| <flow operator> | ::= | -> \| -AP-> \| MISSING \| FIRST \| LAST |
| <semantics predicate> | ::= | <expression> <semantics operator> <semantics predicate> |
| <semantics operator> | ::= | AND \| OR \| >= \| > \| ... |
| <side-effect predicate> | ::= | PERFORM <statement> WHEN <syntax matching block> |
| | \| | PERFORM <statement> WHEN <syntax matching block> REWRITE statement |
| <module statement> | ::= | LET <id> = <statement> |
| | \| | DEFINE <id> { <statement> } |
| | \| | IMPORT <literal> |
| ... | ... | ... (e.g. JavaScript syntax) |

Source program: ~1050

```
public static boolean isEqual(byte[] a, byte[] b) {
    if (a.length != b.length)
        return false;

for (int i = 0; i < a.length; i++) {
        if (a[i] != b[i])
            return false;
    }
}
```

Query: ~1055

```
<|
function _(byte[] $a, byte[] $b) {
    for () {
        if ($1)
            return _;
    }
}
|>
WHERE
$1 USE $a AND
$1 USE $b
```

| MVC Noun | Description |
|---|---|
| <Framework> | Description of Behavior or Structural Pattern used by the application |
| <Model> | Set of classes that describes the data you're working with as well as the business rules that define how the data can be changed or manipulated |
| <View> | Set of classes which defines how the application's UI will be displayed |
| <Controller> | Set of classes that handles communication from the user, overall application flow, and application specific logic |
| <Action> | Controller method that is responsible for handling a specific user interaction |
| <Dispatcher> | Map requests to handlers |
| <Config> | Set of files, attributes and annotations that define the application attack surface and flow of data between components |
| <Request> | Object responsible for passing information from the User to the application or website |
| <Repsonse> | Object responsible for passing information for the application of website to the User |
| <Route> | Mapping between incoming Request URL parameters and Controller actions as well as physical files on disk for non-MVC Frameworks |
| <Connection> | Current network connection of the app |
| <Session> | Current connection session |
| <Interceptor> | A class that is called implicitly before or after an action is performed |

FIG. 13

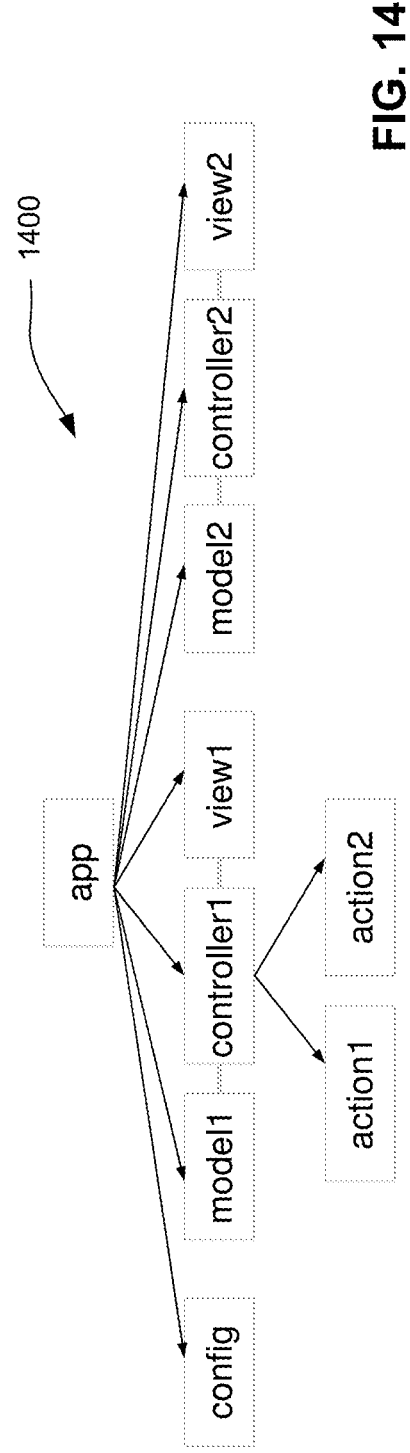

```
// use the "Express" framework
const express = require('express');
// use the "Express Session" middleware
const session = require("express-session");
// other middlewares
const http = require('http');
const path = require('path');
...
const app = express();
// configuration
var b = false;
app.use(session([
    cookie: {
        httpOnly: b,
        secure: true
    }
]));
...
// user routes
app.get('/login', login);
app.get('/logout', logout);
app.post('/users/signup", signup);
app.get("/users/updatetax", updatetax);
...
```

1805 configuration model:

```
session {
    cookie: {
        httpOnly: false,
        secure: true
    };
}
```

1810 route model:

```
route 1:
"/login' -> HTTP GET ->
function login(req, res) {
    res.render('users/login', { title: 'Login'});
};
route 2:
'/users/updatetax' -> HTTP GET ->
updatetax = function(req, res, next) {
    var preTax = eval(req.body.tax);
    var afterTax = eval(v1.afterTax);
    return res.render("contributions", preTax+afterTax);
}
...
```

FIG. 18A

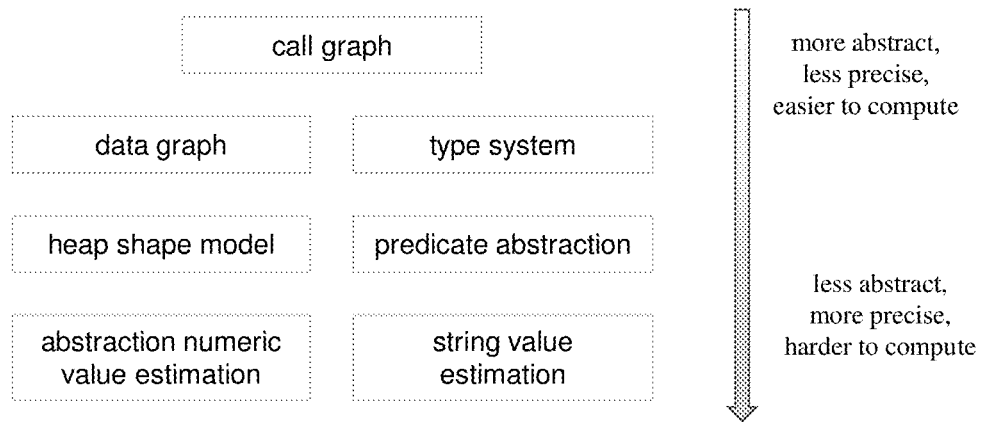

FIG. 19

| Property | Model Type |
|---|---|
| function call relation | call graph |
| injection, dependency | data flow graph |
| variable/object/function type | type system |
| Boolean/numeric value | abstract numeric value estimation |
| configuration | abstract numeric value estimation |
| string value | string value estimation |
| variable data structure | heap shape analysis |
| Boolean formula on Boolean variable | predicate abstraction |

FIG. 20

```
// use the "Express" framework
const express = require('express');
// use the "Express" framework
const session = require("express-session");
const app = express();

// configuration                                          2610
┌─────────────────────────────────────────────┐
│ var b = true;   // previously: var b = false; │
└─────────────────────────────────────────────┘
app.use(session({
    cookie: {
        httpOnly: b,
        secure: true
    }
}));

// user routes
app.get('/login', login);
app.get('/logout', logout);
app.post('/users/signup', signup);
app.get('/users/updatetax', updatetax);
```

2600

```
...
// route implementation for URI "/users/updatetax"
function updatetax(req, res, next) {
┌─────────────────────────────────────────────┐  2615
│ // previously: var preTax = eval(req.body.tax); │
│ var preTax = parseInt(req.body.tax);            │
│ // previously: var afterTax = eval(v1.afterTax);│
│ var afterTax = parseInt(v1.afterTax);           │
└─────────────────────────────────────────────┘
    return res.render("contributions", preTax+afterTax);
}
// route implementation for URI "/logout"
function logout(req, res) {
┌─────────────────────────────────────────────┐  2620
│  ...                                          │
└─────────────────────────────────────────────┘
}
```

SYSTEMS AND METHODS FOR INCREMENTAL ANALYSIS OF SOFTWARE

BACKGROUND

Computer software has become an indispensable tool in many aspects of human life. Day-to-day activities (e.g., shopping, banking, signing up for health insurance, etc.) are often conducted via web and mobile applications. Virtually all organizations, both public and private, rely on software applications to process information and manage operations. Many of these software applications handle sensitive information such as personal financial records, trade secrets, classified government information, etc. Safety-critical systems in infrastructure, transportation, medicine, etc. are increasingly being controlled by software.

Every year, trillions of dollars are spent globally to develop and maintain software applications. Yet system failures and data breaches are constantly in the news. Decades of research has failed to produce scalable and accurate solutions for improving reliability and security of software applications.

SUMMARY

In accordance with some embodiments, a method is provided for performing static analysis of software to detect security vulnerabilities, comprising acts of: generating a first application architecture model for a software application, wherein: the first application architecture model is generated based on a first version of source code of the software application; and the first application architecture model comprises a plurality of component models; comparing a second version of source code against the first version of source code to determine at least one difference; identifying, based on the at least one difference, at least one affected component model of the first application architecture model; and generating, based on the second version of source code, a second application architecture model, wherein generating the second application architecture model comprises generating an updated version of the at least one affected component model.

In accordance with some embodiments, a system is provided, comprising at least one processor and at least one computer-readable storage medium having stored thereon instructions which, when executed, program the at least one processor to perform the above method.

In accordance with some embodiments, at least one computer-readable storage medium is provided, having stored thereon instructions which, when executed, program at least one processor to perform the above method.

DESCRIPTION OF DRAWINGS

The accompanying drawings are not necessarily drawn to scale. For clarity, not every component may be labeled in every drawing.

FIG. 4 shows an illustrative source program 400 and an illustrative discovery query 420, in accordance with some embodiments.

FIG. 5 shows an illustrative source program 500 and illustrative property queries 510 and 515, in accordance with some embodiments.

FIG. 8 shows Backus Normal Form (BNF) definitions of some components of an illustrative query language, in accordance with some embodiments.

FIG. 10 shows an illustrative source program 1050 and an illustrative property query 1055, in accordance with some embodiments.

FIG. 13 shows an illustrate set of nouns that may be used in a query language for accessing components in an MVC architecture, in accordance with some embodiments.

FIG. 14 shows an illustrative hierarchy 1400 of MVC components, in accordance with some embodiments.

FIG. 18A shows an illustrative application 1800 and illustrative component models 1805 and 1810, in accordance with some embodiments.

FIG. 19 shows a plurality of illustrative types of models that may be used by an analysis engine to check a property of interest, in accordance with some embodiments.

FIG. 20 shows an illustrative mapping from types of properties to types of models, in accordance with some embodiments.

FIG. 26A shows an illustrative application 2600 and an illustrative implementation 2605 of route functions in the application 2600, in accordance with some embodiments

DETAILED DESCRIPTION

Figure 1:
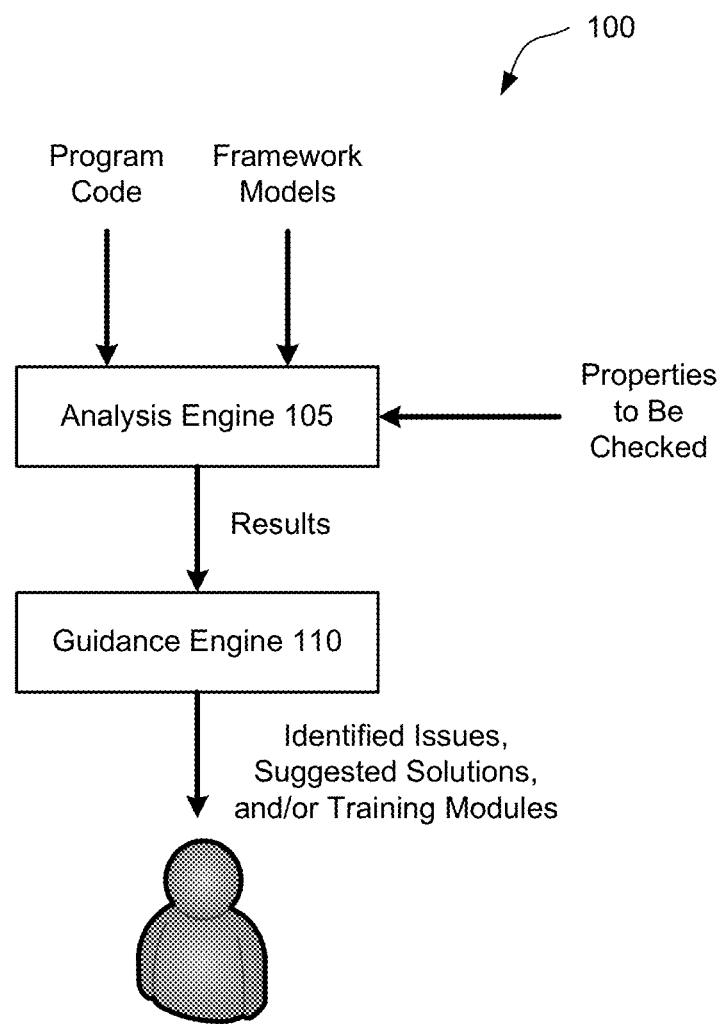
FIG. 1 shows an illustrative system 100 for software verification, in accordance with some embodiments.

The inventors have recognized and appreciated various disadvantages of existing approaches to software verification. For instance, the inventors have recognized and appreciated that some existing approaches focus solely on testing, which happens late in the system development life cycle, when an application or module has already been implemented to a large extent. At that late stage, correcting problems such as security vulnerabilities may involve rewriting not only the portion of code that directly gives rise to an identified problem, but also related portions of code. In some instances, it may be impractical to reverse certain design decisions made during the development stage. As a result, a developer may be forced to adopt a suboptimal solution to an identified problem.

Accordingly, in some embodiments, techniques are provided for detecting potential problems during the development stage, so that an identified problem may be corrected before additional code is written that depends on the problematic code, and a developer may have greater freedom to implement an optimal solution to the identified problem. For instance, a verification tool may be built into an integrated development environment (IDE) and may be programmed to analyze code as the code is being written by a developer. Alternatively, or additionally, a verification tool may be accessed via a web user interface. In either scenario, the verification tool may be able to provide feedback sufficiently quickly (e.g., within minutes or seconds) to allow the developer to make use of the feedback while the developer is still working on the code.

The inventors have recognized and appreciated that some existing approaches of software verification may be unhelpful to software developers. Software development teams are under pressure to deliver products on time and within budget. When a problem is identified through testing, a developer may be given little or no guidance on how to address the problem. As a result, the developer's attempted fix may be ineffective, or may even create new problems. This frustrating process may repeat until the developer stumbles upon a correct solution, often after spending valuable time searching online resources and consulting with peers.

Accordingly, in some embodiments, techniques are provided for integrating training and quality assessment. As an example, a verification tool may be programmed to link an identified problem to one or more targeted training modules. As another example, a verification tool may be programmed to analyze software code to understand a developer's intent and proactively suggest one or more training modules on common problems related to that intent. As yet another example, a verification tool may be programmed to analyze code written by a developer for a particular type of quality issue (e.g., a particular security vulnerability) after the developer views, reads, or otherwise completes a training module on that type of quality issue.

In some embodiments, techniques are provided for presenting verification results to a software developer. The inventors have recognized and appreciated that it may be beneficial to present verification results in a streamlined fashion so that verification may become an integral part of a software developer's work, rather than an interruption. As an example, a verification tool may be programmed to deliver results incrementally, for instance, by first delivering results from easy checks (e.g., syntactic pattern matching), while the system is still performing a deep analysis (e.g., model checking). In this manner, the developer may immediately begin to review and address the results from the easy checks, without having to wait for the deep analysis to be completed.

The inventors have further recognized and appreciated that it may be beneficial to present suggested code transforms in an unintrusive fashion, so that a software developer may come to view the verification tool as a helpful peer, rather than just an annoying issue-flagging feature. For example, a verification tool may be programmed to analyze software code to understand a developer's intent and provide suggested code modifications based on the identified intent. Additionally, or alternatively, the verification tool may allow the developer to test a piece of suggested code in a sandbox.

In some embodiments, a verification tool may be programmed to select, from a variety of different modes, an appropriate mode for delivering guidance to a software developer. For instance, the verification tool may select from static content (e.g., text, video, etc. retrieved from a content store), dynamically generated content (e.g., content that is customized based on current code context), coding suggestions (e.g., suggested fixes to identified problems, or best practice tips based on identified intent), a suggested version of code to be tested in a sandbox, etc.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

I. Software Verification

Some techniques have been developed to automatically analyze program behavior with respect to properties such as correctness, robustness, safety, and liveness. For instance, static analysis techniques have been developed to analyze program code without executing the code, whereas dynamic analysis techniques have been developed to analyze program code by observing one or more executions of the code. Some software verification tools use a combination of static and dynamic analysis techniques.

Examples of static analysis techniques include, but are not limited to, control flow analysis, data flow analysis, abstract interpretation, type and effect analysis, and model checking. An analysis engine implementing one or more of these techniques may receive as input program code and one or more properties to be checked, and may output one or more results (e.g., indicating a property is violated).

Model checking techniques were developed initially for hardware verification, and have been used to some extent for software verification, albeit with lesser success, as software systems tend to be significantly more complex than hardware systems. To verify a program for compliance with a certain specification, a formal model of the program may be constructed, and the model may be checked against the specification. For instance, a model may be formulated as a finite state machine, and a property may be expressed as a formula in a suitable logic. A state space of the finite state machine may be explored to check whether the property is satisfied.

In some implementations, states in a finite state machine may be explicitly enumerated. Alternatively, or additionally, states may be symbolically enumerated, by encoding sets of states into respective symbolic states. In some implementations, a symbolic execution technique may be used, where an interpreter may simulate how a program executes and maintain program state with symbolic data.

II. Programmable Analysis of Software Applications

Many software applications are complex and difficult to analyze. For instance, an application may include hundreds of modules and millions of lines of code, and may make use of external components (e.g., frameworks, libraries, middleware, etc.) that may or may not be open sourced. The inventors have recognized and appreciated that it may be beneficial to provide techniques for abstracting a software application in a manner that focuses on one or more properties of interest, and that it may also be beneficial to provide techniques for abstracting a framework or library.

The inventors have additionally recognized and appreciated various disadvantages of existing approaches for abstraction. For instance, some approaches are purely syntactic, such as using a utility like grep to search through source code for a match of a regular expression, or rely on simple abstractions such as performing a data flow analysis (e.g., based on bit propagation) to abstract a program, and making Boolean marks on library functions in abstractions. The inventors have recognized and appreciated that these approaches may fail to capture program semantics sufficiently, and hence may incur high inaccuracies (e.g., false positives). Furthermore, behaviors of external components such as frameworks and libraries may be modeled poorly, if at all, and precise semantics of a programming language in which an application is written may not be taken into account.

The inventors have further recognized and appreciated that some software verification tools rely on limited methods for specifying properties to be checked. For instance, specification methods based on XML (Extensible Markup Language) or JSON (JavaScript Object Notation) may be cumbersome to use, and may allow only a limited set of constructs, so that many interesting properties cannot be expressed. Furthermore, these methods may not allow a user to specify a modification to be made to an application, for example, when a certain issue is identified.

The inventors have recognized and appreciated that it may be beneficial to provide improved techniques for abstracting an application and/or external components such as frameworks and libraries, and for specifying properties to be checked and/or modifications to be made to an application to satisfy the properties. In some embodiments, a unified method may be provided to allow a user to program any one or more, or all, of the above aspects of a software analysis engine. For example, a universal query language may be provided to allow a user to: (1) model software components including code written by the user and/or external components such as frameworks and libraries, (2) specify properties to be checked, and/or (3) mutate programs to satisfy properties.

FIG. 1 shows an illustrative system 100 for software verification, in accordance with some embodiments. In this example, the system 100 includes an analysis engine 105 and a guidance engine 110. The analysis engine 105 may receive as input program code of a software application to be analyzed. In some embodiments, the input program code may include source code. Alternatively, or additionally, the input program code may include object code. The analysis engine 105 may further receive as input one or more properties to be checked, and may output one or more results of checking the one or more properties against the program code. The one or more results may include a finding indicating whether a property is satisfied, an identification of one or more portions of the input program code that violate a property, and/or a suggested modification to the program code to satisfy a property. For instance, if the program code does not satisfy a particular property, the analysis engine 105 may be programmed to suggest a modification so that the modified program code will satisfy that property.

In some embodiments, the analysis engine 105 may further receive as input one or more framework models. As one example, the analysis engine 105 may be programmed to select and retrieve (e.g., from a database) one or more previously constructed framework models. The selection may be based on any suitable information about the input program code, such as one or more programming languages in which the input program code is written, and/or one or more external components (e.g., frameworks, libraries, and/or middleware) used by the input program code. As another example, one or more framework models may be selected by a user and retrieved by the analysis engine 105 (e.g., from a database). As yet another example, one or more framework models may be constructed by a user and provided to the analysis engine 105.

In some embodiments, a framework model may include one or more discovery queries written in a query language. The inventors have recognized and appreciated that a deep understanding of a software application, such as an architecture of the application, high-level functionalities of various components in the architecture, and/or intrinsic connections among the components, may facilitate accurate and efficient analysis of the application. Accordingly, in some embodiments, techniques are provided for automatically discovering one or more aspects of a software application. For instance, a discovery query may be applied to the application to discover one or more portions of code corresponding to a component in an architecture, one or more functionalities of the discovered component, and/or how the discovered component interact with one or more other components in the architecture.

In some embodiments, discovery queries may be written by a user in a query language. Alternatively, or additionally, discovery queries for particular external components (e.g., frameworks, libraries, and/or middleware) may be developed in advance and retrieved on demand (e.g., from a database) when input program code is to be evaluated.

In some embodiments, a discovery query may include one or more statements instructing the analysis engine 105 how to look for a portion of code that is relevant for a certain analysis (e.g., looking for security vulnerabilities in general, or one or more specific types of security vulnerabilities). Additionally, or alternatively, a discovery query may instruct the analysis engine 105 what information to extract from the program code and store in a model, once a relevant portion of code has been located. Thus, a discovery query may be an executable program that takes as input the program code to be analyzed and produces as output one or more models.

In some embodiments, the analysis engine 105 may be programmed to interpret discovery queries written in a query language. For instance, the analysis engine 105 may execute one or more discovery queries according to semantics of the query language, which may cause the analysis engine 105 to gather certain information from source code elements of a program to be analyzed. However, that is not required, as in some embodiments discovery queries may be compiled into machine code and then the machine code may be executed.

In some embodiments, the analysis engine 105 may be programmed to apply one or more discovery queries to program code and output a model of the program code that is specific to such discovery queries. The model thus represents only a subset of the program code that is relevant to the discovery queries. The analysis engine 105 may then analyze the model and/or a subset of the program code to determine if a certain property of interest is satisfied. In some embodiments, this analysis of the model and/or the subset of the program code may be performed using property queries written in the same query language that is used for the discovery queries.

With the above approach, particular portions of a large application program that are relevant to one or more issues of interest (e.g., security) may be identified and represented by a model, while irrelevant portions of the application may be ignored. The resulting model may then be evaluated, and/or be used to identify relevant portions of the program code that should be evaluated, using one or more property queries relating to the issue(s) of interest. By employing such a divide-and-conquer approach, a highly complex application may be effectively and efficiently evaluated for one or more specific issues of concern.

The inventors have recognized and appreciated that discovery queries may provide a convenient way to capture knowledge regarding a programming language, framework, library, middleware, etc. For instance, a user who understands semantics of a programming language (or framework, library, middleware, etc.) may write discovery queries that help the analysis engine 105 identify portions of program code that are relevant for a certain analysis that is being performed (which may, although need not, be a security analysis). A model that results from applying a discovery query to program code may be an abstraction of the program code with respect to the analysis that is being performed. In this manner, property checking may be performed more efficiently, because much of the program code may be irrelevant for the analysis that is being performed, and may simply be ignored.

The inventors have further recognized and appreciated that framework models may be managed advantageously as reusable assets. For example, once a discovery query is written by a user for a certain analysis on a program written in a certain programming language (or using a certain framework, library, middleware, etc.), the discovery query may be appropriately indexed and stored. In this manner, when the same user or another user wishes to perform the same analysis on a different program written in the same programming language (or using the same framework, library, middleware, etc.), the previously written discovery query may be retrieved and applied.

Returning to the example shown in FIG. 1, one or more results output by the analysis engine 105 may be consumed by the guidance engine 110. The inventors have recognized and appreciated that it may beneficial to provide customized and actionable guidance to a developer when a problem is identified. Accordingly, in some embodiments, the guidance engine 110 may be programmed to select, based on the one or more results output by the analysis engine 105, an appropriate modality for aiding a user who wrote the input program code. Additionally, or alternatively, the guidance engine 110 may be programmed to select, based on the one or more results, appropriate content from a content store. For instance, if the one or more results includes a finding indicative of a security vulnerability, the guidance engine 110 may present to the user a textual or video message explaining the vulnerability, and/or an in-depth training module. Additionally, or alternatively, if the one or more results includes a suggested modification to the input program code, the guidance engine 110 may present to the user a textual or video message explaining the suggested modification, and/or modified program code ready to be tested in a sandbox.

In some embodiments, the guidance engine 110 may automatically determine and present to a user a suggested technique for solving a problem. For example, the guidance engine 110 may determine a solution based on user preferences, an intended use for a software application, and/or other context information about the software application.

It should be appreciated that the system 100 is shown in FIG. 1 and described above solely for purposes of illustration. A software verification tool embodying one or more of the inventive aspects described herein may be implemented in any of numerous ways. For instance, in some embodiments, one or more of the functionalities described above in connection with the analysis engine 105 may instead be implemented by the guidance engine 110, or vice versa. In some embodiments, a software verification tool may be implemented with a single engine programmed to analyze program code and to render guidance to a developer. In some embodiments, the analysis engine 105 and the guidance engine 110 may be independently implemented, each as a stand-alone tool. Aspects of the present disclosure are not limited to the use of both the analysis engine 105 and the guidance engine 110.

As discussed above, the inventors have recognized and appreciated that a deep understanding of a software application, such as an architecture of the application, high-level functionalities of various components in the architecture, and/or intrinsic connections among the components, may facilitate accurate and efficient analysis of the application. In some embodiments, a software architecture may be represented using a framework model comprising one or more discovery queries. By applying such discovery queries to program code, an application architecture model may be generated that includes models for individual components in the architecture. The application architecture model may then be used to facilitate verification of the program code with respect to one or more properties of interest.

Figure 2:
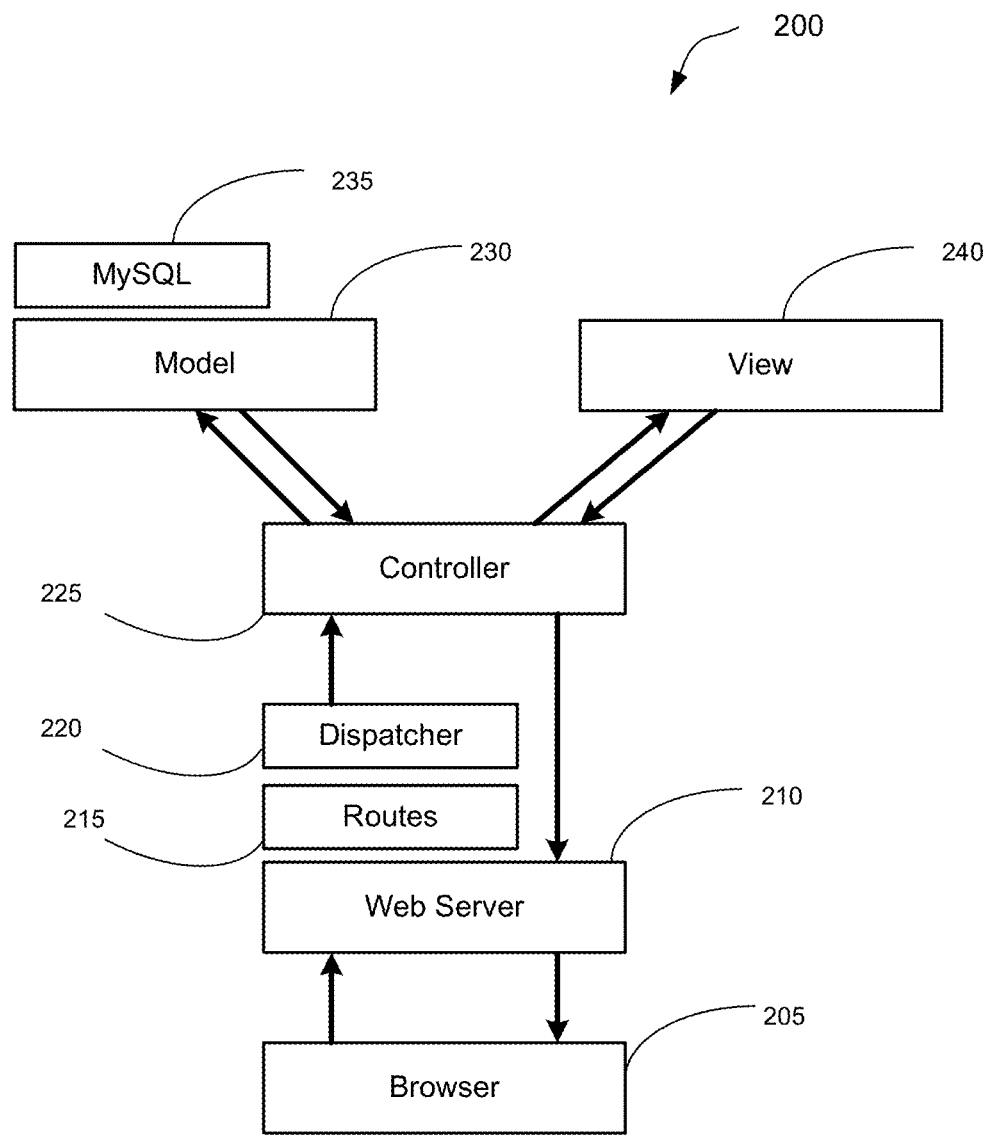
FIG. 2 shows an illustrative model-view-controller (MVC) architecture 200 that may be modeled using one or more discovery queries, in accordance with some embodiments.

FIG. 2 shows an illustrative model-view-controller (MVC) architecture 200 that may be modeled using one or more discovery queries, in accordance with some embodiments. An MVC architecture may be used to build a web application comprising various components having separate responsibilities. In the example shown in FIG. 2, the MVC architecture 200 includes a web server component 210, a routes component 215, a dispatcher component 220, a controller component 225, a model component 230, a database component 235, and a view component 240. The web server component 210 may receive a web request from a browser 205 and the routes component 215 may map the request to one or more actions to be taken by the controller component 225. The dispatcher component 220 may inform the controller component 225 of the one or more actions to be taken, and the controller component 225 may issue one or more commands to be executed by the model component 230. The model component 230 may execute the one or more commands according to logic of the web application and may manage data stored in the database component 235. The controller component 225 may receive an execution result from the model component 230 and may cause the view component 240 to generate an updated view based on the execution result. The controller component 225 may then cause the web server component 210 to respond to the browser 205 with the updated view.

Figure 3:
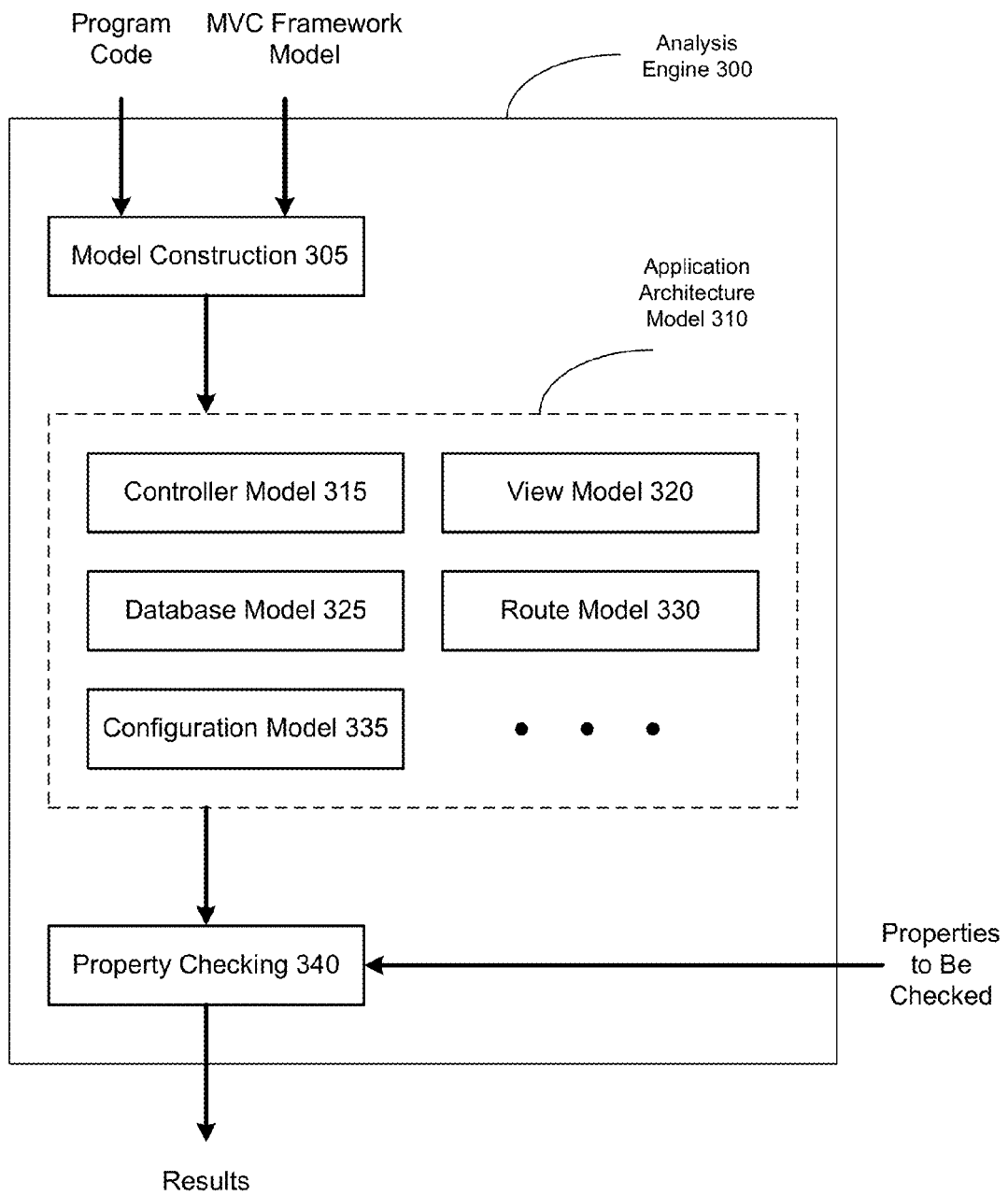
FIG. 3 shows an illustrative analysis engine 300 programmed to generate an application architecture model based on program code and one or more framework models, in accordance with some embodiments.

FIG. 3 shows an illustrative analysis engine 300 programmed to generate an application architecture model based on program code and one or more framework models, in accordance with some embodiments. For instance, the analysis engine 300 may be an implementation of the illustrative analysis engine 105 shown in FIG. 1.

In the example shown in FIG. 3, the analysis engine 300 includes a model construction component 305 and a property checking component 340. The model construction component 305 may receive as input program code (which may include source code and/or object code) and one or more framework models. In some embodiments, the one or more framework models may include one or more discovery queries.

In some embodiments, a framework model may reflect a software architecture, such as the illustrative MVC architecture 200 shown in FIG. 2. The model construction component 305 may be programmed to use the framework model to understand the input program code, for example, by extracting relevant information from the input program code and storing the information in one or more models. In some embodiments, a model may correspond to a component in the software architecture captured by the framework model.

For instance, in the example shown in FIG. 3, the model construction component 305 may be programmed by an MVC framework model to generate an application architecture model 310 that includes a controller model 315, a view model 320, a database model 325, and a route model 330, which may correspond, respectively, to the controller component 225, the view component 240, the database component 235, and the routes component 215 of the illustrative MVC architecture 200 shown in FIG. 2. Additionally, or alternatively, the application architecture model 310 may include a configuration model 335, which may not correspond to any component in the illustrative MVC architecture 200, but may store configuration information extracted from the input program code. Examples of configuration information that may be extracted and stored, include, but are not limited to, session and cookie configurations in web server code.

It should be appreciated that the MVC architecture 200 shown in FIG. 2 and the application architecture model 310 shown in FIG. 3 are provided solely for purposes of illustration, as the inventive aspects described herein may be used to model any software architecture.

FIG. 4 shows an illustrative source program 400 and an illustrative discovery query 420, in accordance with some embodiments. For instance, the source program 400 may be a portion of the input program code shown in FIG. 3, and the discovery query 420 may be included in the MVC framework model shown in FIG. 3.

In the example shown in FIG. 4, the discovery query 420 includes a PERFORM statement with a WHEN clause. The PERFORM statement may specify one or more actions to be performed if a condition specified in the WHEN clause is satisfied. In some embodiments, the WHEN clause may specify a pattern and the one or more actions specified in the PERFORM statement may be performed if the pattern specified in the WHEN clause is detected in the input program code.

For instance, in the example shown in FIG. 4, the WHEN clause specifies a pattern including a call to @RequestMapping with a URL $1, an HTTP method $2, and a function $f. A model construction component (e.g., the illustrative model construction component 305 shown in FIG. 3) may search through the input program code to identify a match of the pattern specified in the WHEN clause. If a match is found, the PERFORM statement may be executed to extract relevant information and store the extracted information in a model (e.g., the illustrative route model 330 shown in FIG. 3).

For example, in the source program 400 shown in FIG. 4, the URL $1 may be matched to the string "/database" at 405, the HTTP method $2 may be matched to the string "get" at 410, and the function $f may be matched to the declaration of injectable Query at 415. As shown at 435, the model construction component may execute the PERFORM statement and store the declaration of injectable Query in a resulting model at the following.

_model.routes["/database"]["get"].callbacks

In this manner, the model construction component may be programmable via a discovery query (e.g., the discovery query 420 tells the model construction component what to look for in the input program code and, once a relevant portion of code is found, what information to extract). For instance, one or more discovery queries (e.g., the illustrative discovery query 420 shown in FIG. 4) may be written to model how a particular framework (e.g., a SpringMVC framework) interprets program annotations (e.g., @RequestMapping). Thus, the one or more discovery queries may represent semantics given to such annotations by the particular framework. One or more models (e.g., the illustrative model 435 shown in FIG. 4) that are constructed by applying the one or more discovery queries may then replace source code of the particular framework for purposes of checking whether one or more properties are satisfied.

Figure 16:
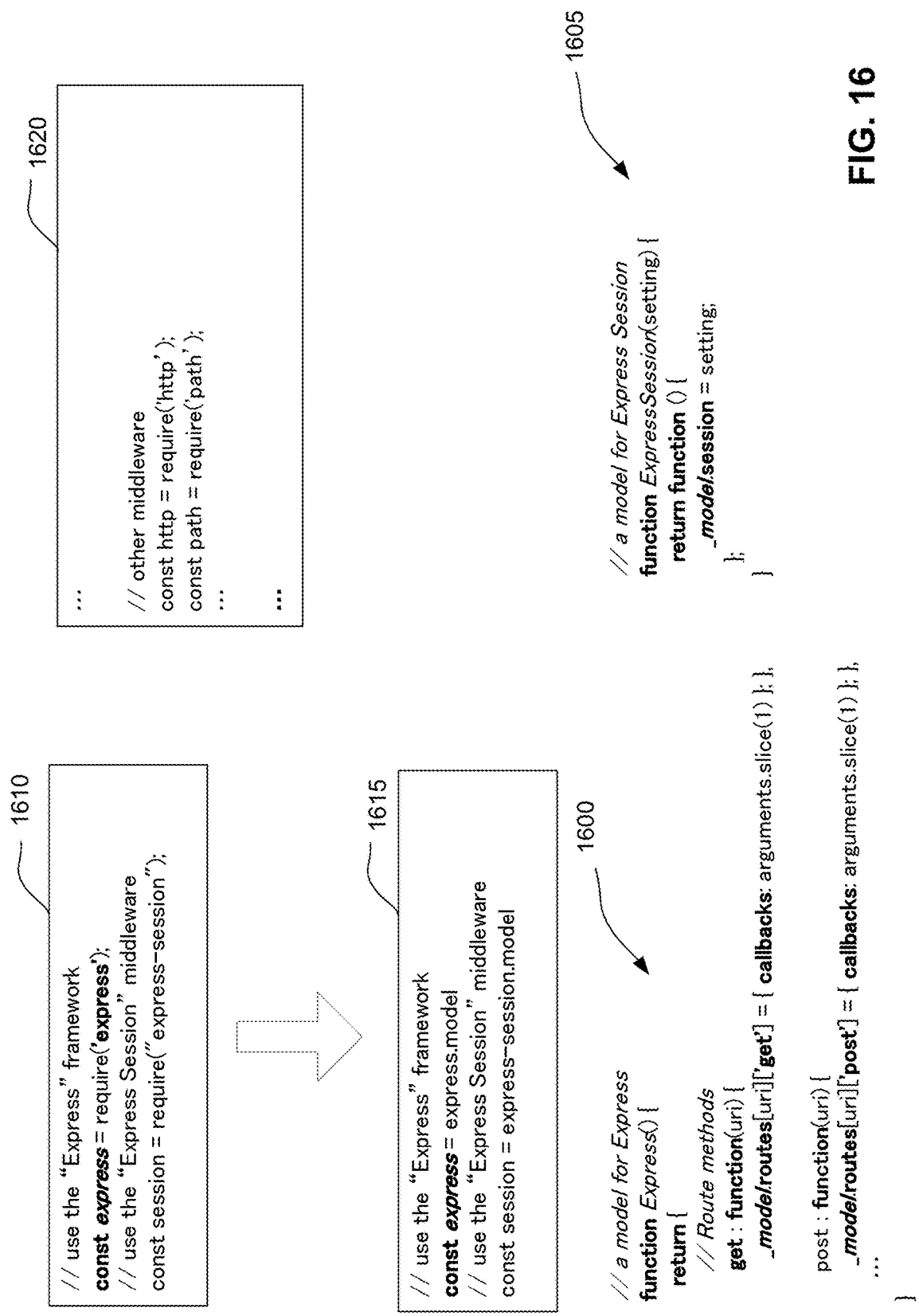
FIG. 16 shows illustrative framework models 1600 and 1605, in accordance with some embodiments.

It should be appreciated that the discovery query 420 is shown in FIG. 4 and described above solely for purposes of illustration. In some embodiments, other types of conditions may be specified, in addition to, or instead of, syntactic pattern matching. Furthermore, aspects of the present disclosure are not limited to the use of a discovery query in a framework model. For instance, in some embodiments (e.g., as shown in FIG. 16 and discussed below), a framework model may include a model that is written directly to replace framework source code. Such a model need not be a result of applying one or more discovery queries.

Returning to the example shown in FIG. 3, the application architecture model 310 may be analyzed by the property checking component 340 of the analysis engine 300 to determine if one or more properties are satisfied. Any suitable combination of one or more property checking techniques may be used, including, but not limited to, data flow analysis, control flow analysis, and/or model checking. The property checking component 340 may then output one or more results, which may include a finding indicating an identified problem (e.g., a security vulnerability), a suggested modification to the input program code to fix an identified problem, an indication that the property checking component 340 is unable to reach a conclusion with respect to a certain property, and/or any other observation of interest. For instance, a result may flag a portion of code that, based on information available to the property checking component 340, does not yet amount to a problem but merits further investigation. In some embodiments, a result output by the property checking component 340 may be processed by a guidance engine, such as the illustrative guidance engine 110 shown in FIG. 1, to provide appropriate feedback advice to a user.

FIG. 5 shows an illustrative source program 500 and illustrative property queries 510 and 515, in accordance with some embodiments. For instance, the source program 500 may be a portion of the input program code shown in FIG. 3, and the property queries 510 and 515 may be included in the properties to be checked shown in FIG. 3.

In the example shown in FIG. 5, the property query 505 includes a PERFORM statement with a WHEN clause. The PERFORM statement may specify one or more actions to be performed if a condition specified in the WHEN clause is satisfied. In some embodiments, the WHEN clause may specify a pattern and the one or more actions specified in the PERFORM statement may be performed if the pattern specified in the WHEN clause is detected in the input program code.

For instance, in the example shown in FIG. 5, the WHEN clause specifies a pattern where an assignment of a variable $x includes a call to getStringParameter or getRawParameter. A property checking component (e.g., the illustrative property checking component 340 shown in FIG. 3) may search through the input program code to identify a match of the pattern specified in the WHEN clause. If a match is found, the property checking component may perform the PERFORM statement to add a field named tainted to the matched variable and set the value of that field to be true. In this manner, the property checking component may be programmable via a property query (e.g., the property query 510 tells the property checking component what to look for in program code and, once a relevant portion of code is found, what information to maintain).

For example, in the source program 500 shown in FIG. 5, the variable $x may be matched to accountName because the assignment of accountName at 520 includes a call to getRawParameter. This may cause the property checking component to execute the PERFORM statement, adding the field accountName.tainted and setting the value of that field to be true.

In some embodiments, a property checking component may be programmed to propagate the value of an added field such as accountName.tainted. For instance, in the source program 500 at 525, the variable accountName is used in an assignment of the variable query. This may cause a field query.tainted to be added and the value of that field set to true. Thus, in this example, the property checking component is programmed to analyze the source program 500 both syntactically (e.g., via syntactic pattern matching on getRawParameter) and semantically (e.g., via data flow analysis on the field tainted).

In some embodiments, a property checking component may be programmed to detect and maintain type information. For instance, in the source program 500 at 530, an assignment of the variable statement includes an invocation of connection.createStatement. The property checking component may be programmed to determine type information based on this assignment and associate the type information with the variable statement.

In the example shown in FIG. 5, the property query 515 includes a MATCH clause, a WHERE clause, and a REWRITE clause. The REWRITE clause may specify one or more modifications to be made to the program code if a condition specified by the MATCH and WHERE clauses is satisfied.

For instance, in the source program 500 shown in FIG. 5, the object $o may be matched to statement at 535, the method $f may be matched to executeQuery at 540, and the parameter $1 may be matched to the variable query at 545. The property checking component may then use the type information associated with the variable statement to determine that the object $o, which is matched to statement, is an instance of java.sql.Statement. The property checking component may further determine that the name of the method $f, which is matched to executeQuery, matches the regular expression "execute.*," and that the value of the tainted field of the parameter $1, which is matched to the variable query, is true. Since all of the conditions in the WHERE clause are satisfied, the property checking component may execute the REWRITE clause, which may replace the variable query with API.sanitize(query), so that the last line in the source program 500 may become:

ResultSet results=statement.executeQuery(API.sanitize (query)).

Thus, in this example, the property query 515 programs the property checking component to use syntactic information (e.g., presence of the substring execute), data flow information (e.g., propagation of the field tainted), and type information (e.g., a type of the variable statement) to determine whether to make a particular modification to the input program code.

It should be appreciated that the property queries 510 and 515 are shown in FIG. 5 and described above solely for purposes of illustration. Aspects of the present disclosure are not limited to the use of syntactic analysis, data flow analysis, or type analysis. Furthermore, aspects of the present disclosure are not limited to the use of a REWRITE clause, as a property checking component may sometimes report a finding without suggesting a modification to the input program code.

Figure 6:
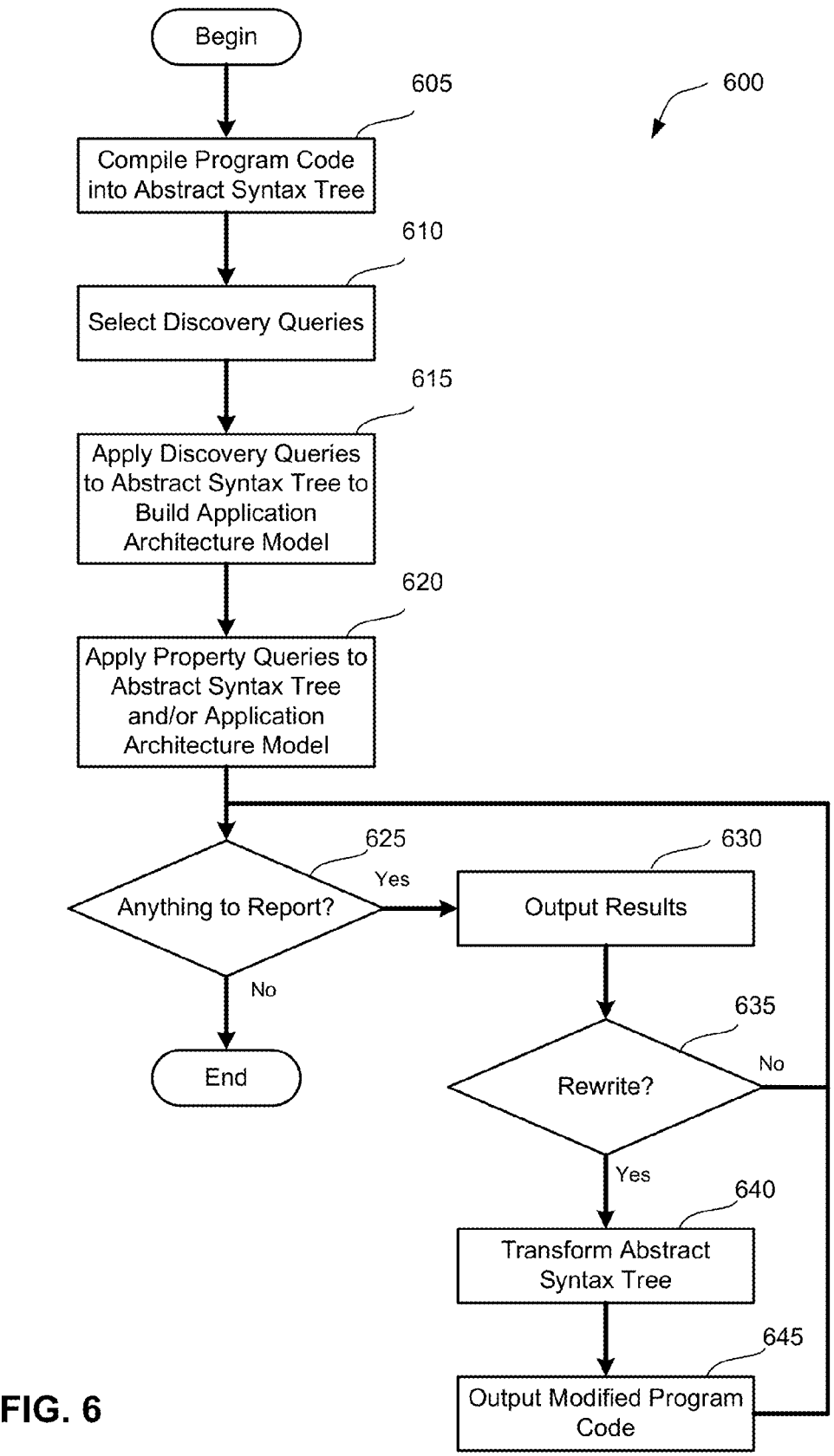
FIG. 6 shows an illustrative process 600 that may be performed by an analysis engine, in accordance with some embodiments.

FIG. 6 shows an illustrative process 600 that may be performed by an analysis engine, in accordance with some embodiments. For example, the process 600 may be performed by the illustrative analysis engine 300 shown in FIG. 3 to construct the illustrative application architecture model 310 and check one or more properties.

Figure 7:
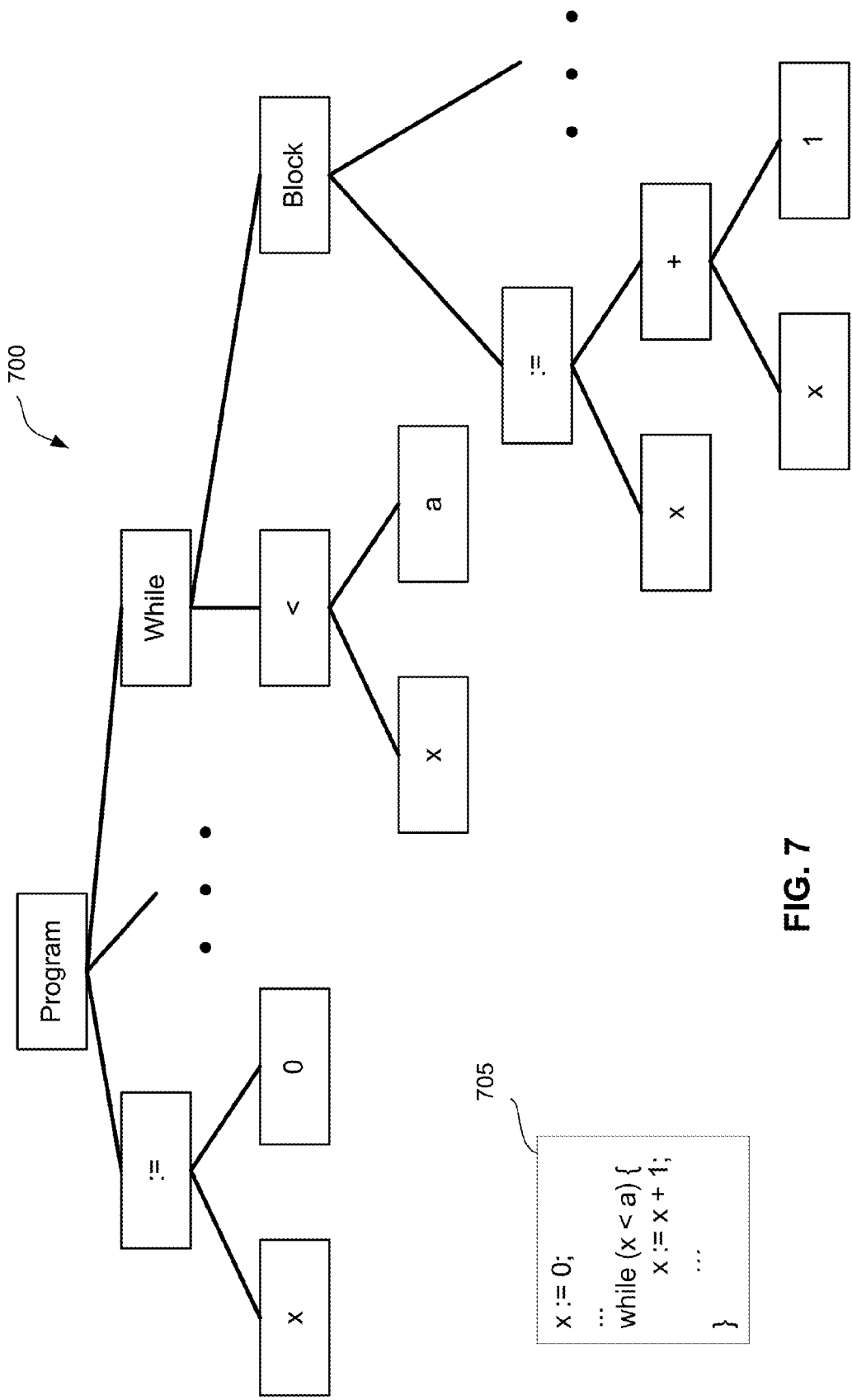
FIG. 7 shows an illustrative AST 700 for an illustrative program 705, in accordance with some embodiments.

At act 605, the analysis engine may compile input program code into a suitable representation, such as an abstract syntax tree (AST). FIG. 7 shows an illustrative AST 700 for an illustrative program 705, in accordance with some embodiments. The inventors have recognized and appreciated that an AST may be used to capture the structure of a program and facilitate manipulations such as annotations and/or modifications. However, it should be appreciated that aspects of the present disclosure are not limited to the use of an AST, or any representation at all. Examples of representations that may be used instead of, or in additional to, ASTs include, but are not limited to, byte-code, machine code, control flow graphs, logic formulas modeling the semantics, etc.

At act 610, the analysis engine may select one or more discovery queries to be applied to the AST constructed at act 605. For instance, in some embodiments, the analysis engine may be programmed to select and retrieve (e.g., from a database) a previously constructed framework model that includes one or more discovery queries. The selection may be based on any suitable information about the input program code, such as one or more programming languages in which the input program code is written, and/or one or more external components (e.g., frameworks, libraries, and/or middleware) used by the input program code. Additionally, or alternatively, the analysis engine may be programmed to select and retrieve (e.g., from a database) one or more discovery queries based on a type of analysis to be performed (e.g., looking for security vulnerabilities in general, or one or more specific types of security vulnerabilities).

In some embodiments, the analysis engine may retrieve (e.g., from a database) a discovery query selected by a user. Additionally, or alternatively, the analysis engine may receive, via a user interface, a discovery query written by a user. In some embodiments, the user interface may be part of an IDE, although that is not required.

At act 615, the analysis engine may apply the one or more discovery selected at act 610 to the AST constructed at act 605. An illustrative application of a discovery query is shown in FIG. 4 and discussed above.

In some embodiments, the analysis engine may first apply one or more discovery queries to extract relevant information from the AST constructed at act 605, thereby constructing a reduced AST. The analysis engine may then apply one or more discovery queries to the reduced AST to construct an application architecture model. Alternatively, or additionally, the analysis engine may apply one or more discovery queries directly to the AST constructed at act 605 to construct an application architecture model. Any suitable method may be used to traverse an AST. For instance, in some embodiments, AST nodes may be visited based on control flow, and relationships between the AST nodes may be examined to check a query. In some embodiments, an analysis state may be maintained during such a traversal. For example, when an AST node is visited, semantic information may be recorded in the analysis state, which may be made available when a next AST node is processed. The query may then be checked over the information stored in the analysis state.

At act 620, the analysis engine may apply one or more property queries to the application architecture model constructed at act 615. Additionally, or alternatively, the analysis engine may apply one or more property queries to the AST constructed at 605, and/or any reduced AST constructed at act 605 (e.g., portions of the AST constructed at 605, and/or any reduced AST constructed at act 605, that correspond to component models in the application architecture model constructed at act 615). An illustrative application of property queries is shown in FIG. 5 and discussed above.

At act 625, the analysis engine may determine if the application of one or more property queries at act 620 has resulted in any observation of interest. If there is an observation of interest, the analysis engine may, at act 630, output one or more results. The one or more results may include an indication of an identified problem (e.g., a security vulnerability), a suggested modification to the input program code to fix an identified problem, an indication that the analysis engine is unable to reach a conclusion with respect to a certain property, a portion of code that merits further investigation, and/or any other observation of interest.

At act 635, the analysis engine may determine if the application of one or more property queries at act 620 has resulted in a suggested modification to the input program code. If there is a suggested modification to the input program code, the analysis engine may, at act 640, transform the AST constructed at act 605. For example, the analysis engine may execute a mutation query (e.g., with a REWRITE clause) to replace a portion of code (e.g., the variable query in the example of FIG. 5) with another portion of code (e.g., APLsanitize(query) in the example of FIG. 5).

At act 645, the analysis engine may use the transformed AST to modify the input program code and output the modified program code. In some embodiments, a user interface may be provided to allow a user to authorize use of the modified program code and/or to test the modified program code in a sandbox. Alternatively, or additionally, a branch may be created in a version control system for the modified program code generated by the analysis engine.

Upon outputting the modified program code, or if it is determined at act 635 that there is no suggested modification to the input program code, the analysis engine may return to act 625 to determine if there is any additional observation of interest. The inventors have recognized and appreciated that some property queries may take more computing time to answer. Accordingly, in some embodiments, the analysis engine may be programmed to output results incrementally. For example, the analysis engine may first deliver results from easy checks (e.g., syntactic pattern matching), while the analysis engine is still performing a deep analysis (e.g., model checking). In this manner, the user may immediately begin to review and address the results from the easy checks, without having to wait for the deep analysis to be completed.

It should be appreciated that details of implementation are described above solely for purposes of illustration, as aspects of the present disclosure are not limited to any particular manner of implementation. For instance, in some embodiments, a separate guidance engine may be provided that consumes outputs of the analysis engine and renders guidance to a developer based on the analysis engine's outputs.

III. Query Language

The inventors have recognized and appreciated that it may be beneficial to provide a unified method for understanding, modeling, checking, and/or fixing software applications with respect to one or more properties of interest (e.g., security vulnerabilities in general, or one or more specific types of security vulnerabilities).

In some embodiments, a query language may be provided to allow a user to program any one or more aspects of software verification, which may include, but are not limited to:

- modeling one or more external components (e.g., frameworks, libraries, and/or middleware) used by a software application;
- constructing models of the application that abstract away irrelevant information (e.g., information that is irrelevant for a certain type of analysis such as security analysis);
- specifying one or more properties to be checked against the application;
- specifying how the application should be fixed if a problem is identified; and/or
- controlling how an analysis engine analyzes the application.

In some embodiments, a query language may be provided that is more expressive than existing techniques for verifying software applications. For example, the query language may be a superset of a full realistic programming language (e.g., JavaScript). In some embodiments, a query language may be provided that is more powerful than existing techniques for verifying software applications. For example, the query language may be used to define semantic abstractions of a program and/or external components (e.g., frameworks, libraries, and/or middleware) used by the program. Additionally, or alternatively, the query language may be used to query program semantics. In some embodiments, a query language may be provided that is more convenient to use than existing techniques for modeling software applications. For example, the query language may have a succinct syntax and may allow modular definitions.

FIG. 8 shows Backus Normal Form (BNF) definitions of some components of an illustrative query language, in accordance with some embodiments. Such a query language may be used, for example, to write the illustrative discovery query 420 shown in FIG. 4 and the illustrative property queries 510 and 515 shown in FIG. 5.

The inventors have recognized and appreciated that a query language having the illustrative constructs shown in FIG. 8 and/or described herein may advantageously provide an expressive, powerful, and convenient method for software verification. For example, these constructs may allow different types of analyses (e.g., static scanning, data flow analysis, fuzzing, dynamic scanning, etc.) to be specified using the same query language, so that the different types of analyses may be combined in a deep way. Furthermore, these constructs may allow different data sources to be queried using the same query language, so that query results regarding the different data sources may be assessed collectively.

However, it should be appreciated that aspects of the present disclosure are not limited to the use of a query language having all of the constructs shown in FIG. 8 and/or described herein. In various embodiments, any one or more of these constructs, and/or other constructs, may be included in a query language.

A. Syntax Matching Blocks

In some embodiments, a query language may include constructs for syntax matching blocks, flow operators, semantic predicates, side-effect statements, and/or application programming interface (API) functions for an analysis engine.

- Syntax matching blocks may be based on source code syntax for any one or more programming languages, such as JavaScript, Java, C/C++/Objective-C, SWIFT, ASP.NET, Python, Ruby, etc.
- Flow operators may be used to connect syntax matching blocks to describe flows between different portions of a program.
- Semantic predicates may be built using first order logic and/or native constructs and may be used for semantics queries.
- Side-effect statements may be used to instruct the analysis engine to perform specific actions, such as building models for a program and/or modifying input program code.
- API functions may be used to access internal state of the analysis engine and/or program how the analysis engine performs an analysis.

In some embodiments, a query language may be provided that uses source language syntax directly for syntax matching. For instance, in the example shown in FIG. 8, the notation <{<source syntax>}> describes a syntax matching block for matching a syntactic element in a source language, where free variables (which are prefixed by "$") are assigned if a match is found. Thus, syntax matching in this query language may depend on the syntax of a source language (e.g., JavaScript, Java, C/C++/Objective-C, SWIFT, ASP.NET, Python, Ruby, etc.).

As an example, if variable assignment is denoted by "=" in a source language, then the syntax matching block <{a=$b}> may match any assignment statement that assigns a value to the variable a. For instance, the syntax matching block <{a=$b}> may match the statement, a=a+x, where the syntactic element a+x may be assigned to the free variable $b.

As another example, the following syntax matching block may be specific to the syntax of Java SpringMVC.

```
<{ @RequestMapping(value =$1, method = $2)
    $f
}>
```

This syntax matching block may match a function declaration with an annotation of route information, where the route's URL may be assigned to the free variable $1, the name of the HTTP method may be assigned to the free variable $2, and the function declaration may be assigned to the free variable $f.

In some embodiments, a syntax matching block may include OR as a syntax operator. For instance, the syntax matching block <{getStringParameter( ) OR getRawParameter( )}> may match a function call to getStringParameter or getRawParameter.

In some embodiments, a syntax matching block may include a character (e.g., "_") for a "don't care" element. For instance, the following pattern may match any for loop regardless of the condition, as long as the body of the for loop matches.

```
// pattern
for (_) {
    if ($1)
        $2;
}
```

In some embodiments, a syntax matching block may include a syntax operator AS. For instance, the syntax matching block <{$f(_,$2)}>AS $call may match a function call of two arguments. When a match is found, the function name may be assigned to $f, and the second argument may be assigned to $2, while the first argument may not be stored. Because of the use of the AS operator, the entire function call information, including function name, function declaration, and/or one or more matched arguments, may be stored in $ call.

In some embodiments, a syntax matching block may include multilayer static scopes. For instance, nested scopes may be expressed using braces and may be matched according to the syntax of a source language (e.g., JavaScript, Java, C/C++/Objective-C, SWIFT, ASP.NET, Python, Ruby, etc.). As an example, the illustrative for loop pattern above may have two matches in the following program code.

```
// program
if (b) {
    for (var i = 1; i < 10; i++) {
        for (var k in [1,2,3]) {
            if (x > A[i]) {
                if (b[k])
                    x = 1;
            }
        }
    }
}
```

In the first match, the syntactic element x>A[i] is assigned to $1, and the syntactic element if (b[k])x=1 is assigned to $2. In the second match, the syntactic element b[k] is assigned to $1, and the syntactic element x=1 is assigned to $2. In both matches, both scopes (i.e., for loop and if branch) are matched syntactically.

B. Flow Operators

In some embodiments, a query language may include one or more flow operators, for example, to describe relationships between syntactic elements. For instance, one or more temporal operators may be used to describe how a syntactic element flows to another syntactic element. In some embodiments, an analysis engine may match a flow statement through a finite state machine algorithm. For instance, a finite state machine may be defined that includes at least two states. At the first state, the analysis engine may analyze portions of input program code, looking for a first syntactic element. The analysis engine may stay in the first state until the first syntactic element is matched. Once the first syntactic element is matched, the analysis engine may move to the second state, where the analysis engine may analyze further portions of the input program code, looking for a second syntactic element.

In some embodiments, a basic flow operator (→) may be used to express that a syntactic element is followed by another syntactic element in at least one program path. As one example, the flow statement <{$f1($a1)→$f2($a2)}> may be matched if one function call is followed by another function call in at least one program path, where the two function may be different, but each of the two functions has a signal argument. The name of the function that is called earlier may be assigned to $f1, and the argument of that function may be assigned to $a1, while the name of the function that is called later may be assigned to $f2, and the argument of that function may be assigned to $a2.

As another example, the following flow statement may be matched if there is at least one program path in which a method of an object is invoked on a variable which was previously assigned the return value of a call to getStringParameter or getRawParameter. The name of the variable may be assigned to $x, the name of the object may be assigned to $o2, and the name of the function of the object may be assigned to $f.

<{$x=_.getStringParameter( ) OR_.getRawParameter( )→$o2.$f($x)}>

In some embodiments, an all-path flow operator (-AP→) may be used to express that a syntactic element is followed by another syntactic element in all program paths. For instance, the flow statement <{$f1($a1)-AP→$f2($a2)}> may be matched if a call to a first function with a first argument is followed by a call to a second function with a second argument in all program paths. The name of the first function may be assigned to $f1, and the first argument may be assigned to $a1, while the name of the second function may be assigned to $f2, and the second argument may be assigned to $a2.

In some embodiments, an absence operator (MISSING) may be used to express that in no program path a first syntactic element happens between a second syntactic element and a third syntactic element. For instance, the flow statement <{$f1($a1)→MISSING $a2=_→ $f2($a2)}> may be matched if there is a program path in which a first function call is followed by a second function call, and there is no assignment to the argument of the second function call between the two function calls.

In some embodiments, operators FIRST and LAST may be used to match, respectively, the first and last occurrences of a syntactic element. For instance, the flow statement <{FIRST f1($a1)→LAST f2($a2)}> may be matched if the first call to f1 precedes the last call to f2 in at least one program path, where other calls to f1 and f2 in that program path may be ignored.

C. Semantic Predicates

In some embodiments, a query language may be provided that includes one or more semantics predicates for expressing properties relating to variable values, types, etc. Unlike syntax matching blocks, which may be used to query the syntax of a program, semantic predicates may be used to query semantics of a program, such as values of variables, types of variables, and/or semantic relationships between variables.

In some embodiments, semantic predicates may be built using first order logic and/or native constructs. Examples of operators for building semantic predicates include, but are not limited to:
  arithmetic operators (e.g., +, −, *, /, %, etc.);
  relational operators (e.g., >=, >, ==, etc.);
  propositional logic operators (e.g., AND, OR, NOT, IMPLY, etc.);
  first-order logic quantifiers (e.g., EXIST, FORALL, etc.);
  domain-specific operators (e.g., RegExp.match, string.indexOf, etc.);
  type operators (e.g., instanceof, ISCONSTANT, etc.); and/or
  flow operators (e.g., USE, CALL, etc.).

In some embodiments, an existentially quantified expression EXIST v IN c:body may evaluate to true if there is a value v in the set c such that a condition specified in the body is true. As one example, the expression EXIST x IN [1,2]: x>0 may evaluate to true because there is a value x in the range [1,2] such that x is greater than 0. As another example, the expression EXIST arg IN ƒ.arguments:arg.taint==true may evaluate to true if there is an argument in the set of arguments ƒ.arguments such that the taint field of the argument is set to true.

In some embodiments, a universally quantified expression FORALL v IN c:body may evaluate to true if for every value v in the set c, a condition specified in the body is true. For example, the following expression may evaluate to true if for every index y in the object _model.routes, the route indexed by y, _model.routes[y], is not null.

FORALL y IN_model.routes:_model.routes[y] !=null

In some embodiments, a data-flow operator USE may be used to express that a value of a second syntactic element is used to compute a value of a first syntactic element. For example, the expression $arg USE $input may evaluate to true if a value of the syntactic element assigned to $input is used to compute a value of the syntactic element assigned to $arg.

In some embodiments, a control-flow operator CALL may be used to express that a call to a first function includes a call to a second function. For example, the expression $f1 CALL $f2 may evaluate to true if a call to the function assigned to $f1 includes a call to the function assigned to $f2.

D. Side-Effect Statements

In some embodiments, a query language may be provided that includes one or more side-effect constructs. For instance, a side-effect construct may be used to define a discovery query, such as the illustrative discovery query 420 shown in FIG. 4.

In some embodiments, the following illustrative side-effect construct may be used, where the PERFORM statement may specify one or more actions to be performed if a condition specified in the WHEN clause is satisfied.

PERFORM <statement> WHEN <syntax matching block>

In some embodiments, the WHEN clause may specify a pattern and the one or more actions specified in the PERFORM statement may be performed if the pattern specified in the WHEN clause is detected in input program code. For instance, the PERFORM statement may include a piece of executable code, where the WHEN clause may include a syntax matching block (which may in turn include a semantic predicate). In some embodiments, a query language may be a superset of the syntax of a high-level programming language (e.g., JavaScript), so the PERFORM statement may use any one or more constructs provided by the high-level programming language.

For example, the following discovery query, when executed by an analysis engine, may cause the analysis engine to search input program code for a declaration of a route function in an MVC architecture, where the HTTP method in the declaration is a method of a RequestMethod object. The route's URL may be assigned to the free variable $1, the name of the method may be assigned to the free variable $2, the name of the route function may be assigned to the free variable $3, and the entire function declaration may be assigned to the free variable $f (using the AS operator). The PERFORM statement may cause the analysis engine to store the function declaration in a route model (e.g., such as the illustrative route model 330 shown in FIG. 3).

PERFORM _model.routes[$1][$2].callbacks=[$f]
WHEN <{@RequestMapping(value=$1, method=RequestMethod.$2) function $3(_){_}- AS $f}>

Additionally, or alternatively, a PERFORM statement may be used to inject data into an AST (e.g., an AST compiled directly from input program code, or a reduced AST constructed by removing certain information). For instance, in the following illustrative PERFORM statement, the WHEN clause may specify a pattern where an assignment of a variable $x includes a call to getStringParameter or getRawParameter. If an analysis engine finds a match of this pattern, the analysis engine may add a field named tainted to the matched variable and set the value of that field to be true. In some embodiments, the analysis engine may be programmed to propagate the value of the tainted field.

PERFORM $x.tainted=true
WHEN <{$x=getStringParameter( ) OR getRawParameter( )}

In some embodiments, data maintained in an added field may be used to facilitate property checking and/or code editing. For instance, the following illustrative property query may be used to check if an argument of a call to a method of an object is tainted, and if so, replace the argument with a sanitized version of the argument.

<{$o.$f($1)}>
WHERE $1.tainted==true
REWRITE $1<=SanitizerAPI.sanitize($1)

Figure 9:
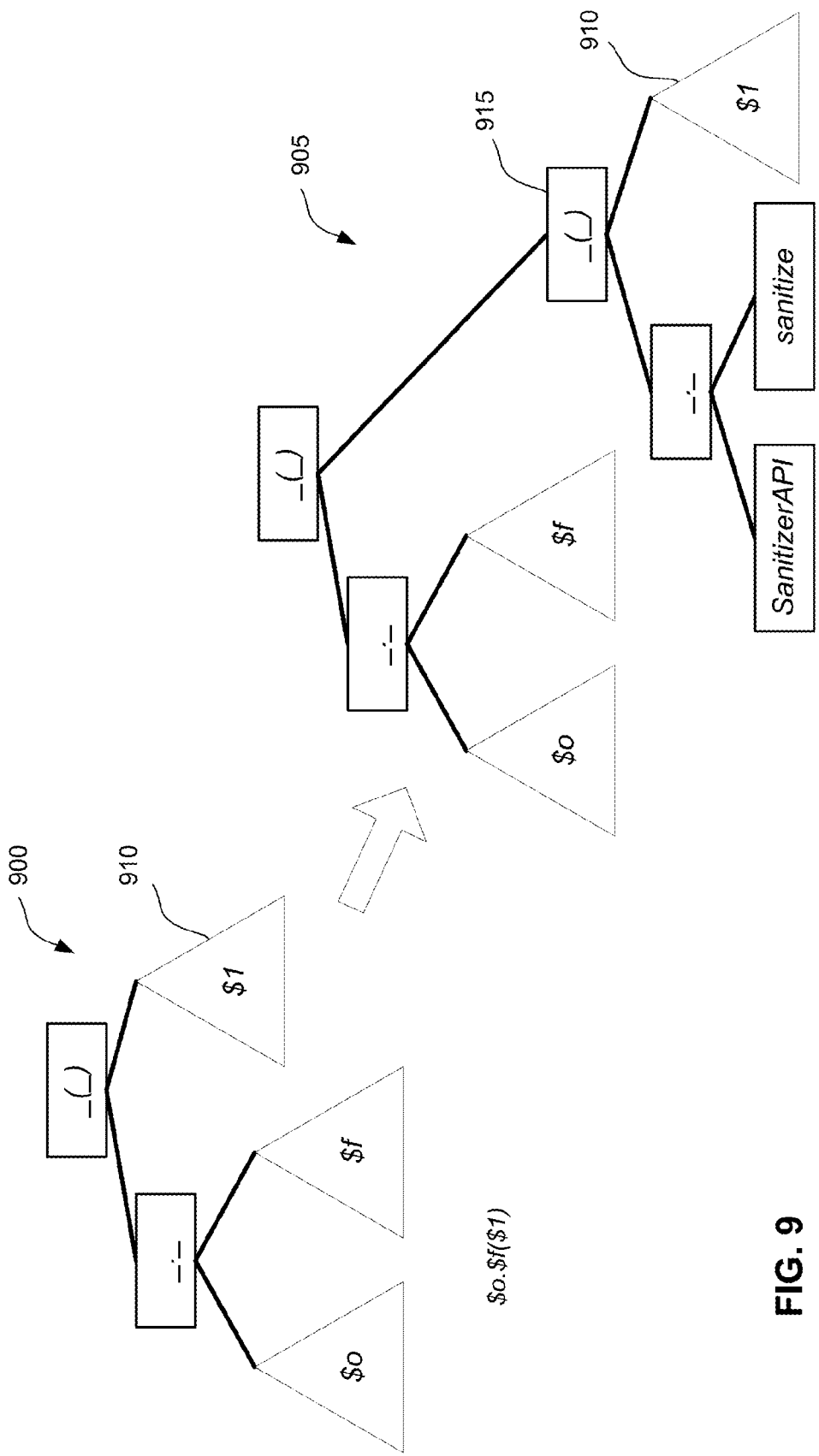
FIG. 9 shows a transformation of an illustrative AST 900 to a transformed AST 905, in accordance with some embodiments.

FIG. 9 shows a transformation of an illustrative AST 900 to a transformed AST 905, in accordance with some embodiments. For instance, this transformation may be performed by an analysis engine in executing the illustrative property query described above to syntactically replace a subtree 910 assigned to the free variable $1 with a different subtree at a node 915. The new subtree may correspond to applying the sanitize function in the SanitizerAPI library to the argument $1, and may be constructed by attaching the subtree 910 to the node 915 as the argument of SanitizerAPI.sanitize.

FIG. 10 shows an illustrative source program 1050 and an illustrative property query 1055, in accordance with some embodiments. In this example, the source program 1050 may implement a bitwise comparison between two bit strings, which may be cryptographic digests such as CRCs (cyclic redundancy checks) or HMACs (keyed-hash message authentication codes). This particular implementation may be vulnerable to side-channel attacks because execution time of the for loop may be input dependent. For instance, the for loop may exit early if a difference is detected early in the bit strings, and may run through the entire lengths of the bit strings if the bit strings are identical. This type of comparison is sometimes called a "fail fast" comparison.

In some embodiments, a property query may program an analysis engine to detect "fail fast" comparisons. For instance, in the example shown in FIG. 10, the property query 1055 may be written using a data-flow operator USE, which may cause the analysis engine to search for a function declaration that has two byte arrays as arguments ($a and $b) and includes a for loop with an if statement in the body of the for loop, where the condition ($1) of the if statement depends on both of the byte array arguments ($1 USE $a AND $2 USE $b). Thus, the property query 1055 may cause the analysis engine to perform a combination of syntactic matching and data flow analysis to detect a "fail fast" comparison.

Figure 11:
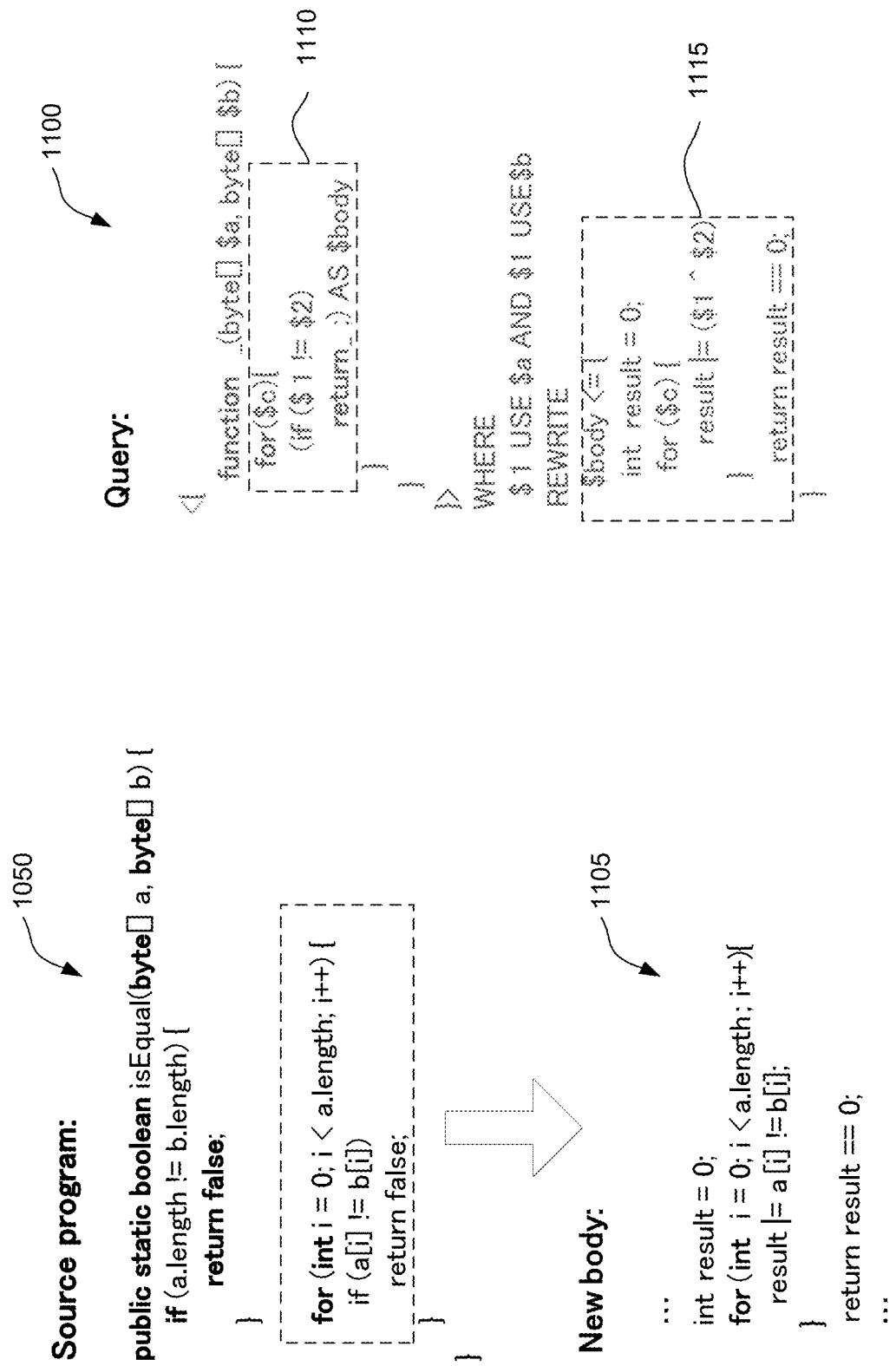
FIG. 11 shows an illustrative property query 1100, in accordance with some embodiments.

In some embodiments, a property query may program an analysis engine to remove a vulnerability caused by a "fail fast" comparison. FIG. 11 shows an illustrative property query 1100, in accordance with some embodiments. Like the illustrative property query 1055 shown in FIG. 10, the property query 1100 may program an analysis engine to detect a "fail fast" comparison. Additionally, the property query 1100 may cause the analysis engine to assign a syntactic element (e.g., a subtree in an AST) corresponding to the for loop to a free variable $body, for example, using an AS operator at 1110. At 1115, the property query 1100 may cause the analysis engine to replace the syntactic element assigned to $body with a new body 1105, resulting in a transformed function declaration. The transformed for loop may not exit early, even if a difference has been detected, thereby removing the vulnerability to side-channel attacks.

E. Analysis Engine API Functions

In some embodiments, a query language may be provided that includes one or more API functions for accessing internal state of an analysis engine and/or programming how the analysis engine performs an analysis. The inventors have recognized and appreciated that an analysis engine may maintain useful information, such as ASTs (e.g., ASTs compiled directly from input program code, and/or reduced ASTs constructed by removing certain information), variable values, variable types, analysis results, internal data structures, relationships between internal data, etc. Accordingly, a query language may implement a protocol for exposing some or all of the information maintained by the analysis engine.

For example, an analysis engine may maintain a function closure as an internal representation of a function in an AST. This closure may include information such as an original AST, parent scope, type information, member declarations within a body of the function body, etc. In some embodiments, an API construct, $f.ast, may be used to obtain an AST stored by the analysis engine for the syntactic element assigned to $f, and an API construct, $fast.name, may be used to obtain the function name in the AST. Additionally, or alternatively, the statement, FORALL v IN $f:v instanceof String, may be used to enumerate all data members in a function closure that are of the type String.

F. Aliases, Macros, and Modules

In some embodiments, a query language may allow definitions of aliases, macros, and/or modules. The inventors have recognized and appreciated that such definitions may be used to enhance reusability and modularization. However, it should be appreciated that aspects of the present disclosure are not limited to the use of any alias, macro, or module.

In some embodiments, a keyword let may be used to introduce an alias. An example is as follows.

let source=getStringParameter( ) OR getRawParameter( )

With this illustrative alias, the following queries are equivalent.

PERFORM $x.tainted=true
    WHEN <{$x=source>}
    PERFORM $x.tainted=true
    WHEN <{$x=getStringParameter( ) OR getRawParameter( )>}

In some embodiments, a keyword DEFINE may be used to introduce a macro. An example is as follows.

DEFINE isStatement(v){v instanceof java.sql.Statement;}

With this illustrative macro, the following queries are equivalent.

MATCH <{$o.$f($1)}>
    WHERE isStatement($o)
    MATCH <{$o.$f($1)}>
    WHERE $o instanceof java.sql.Statement;

In some embodiments, a keyword IMPORT may be used to load one or more query definitions from a query source file. This construct may advantageously allow query definitions to be modularized.

Figure 12:
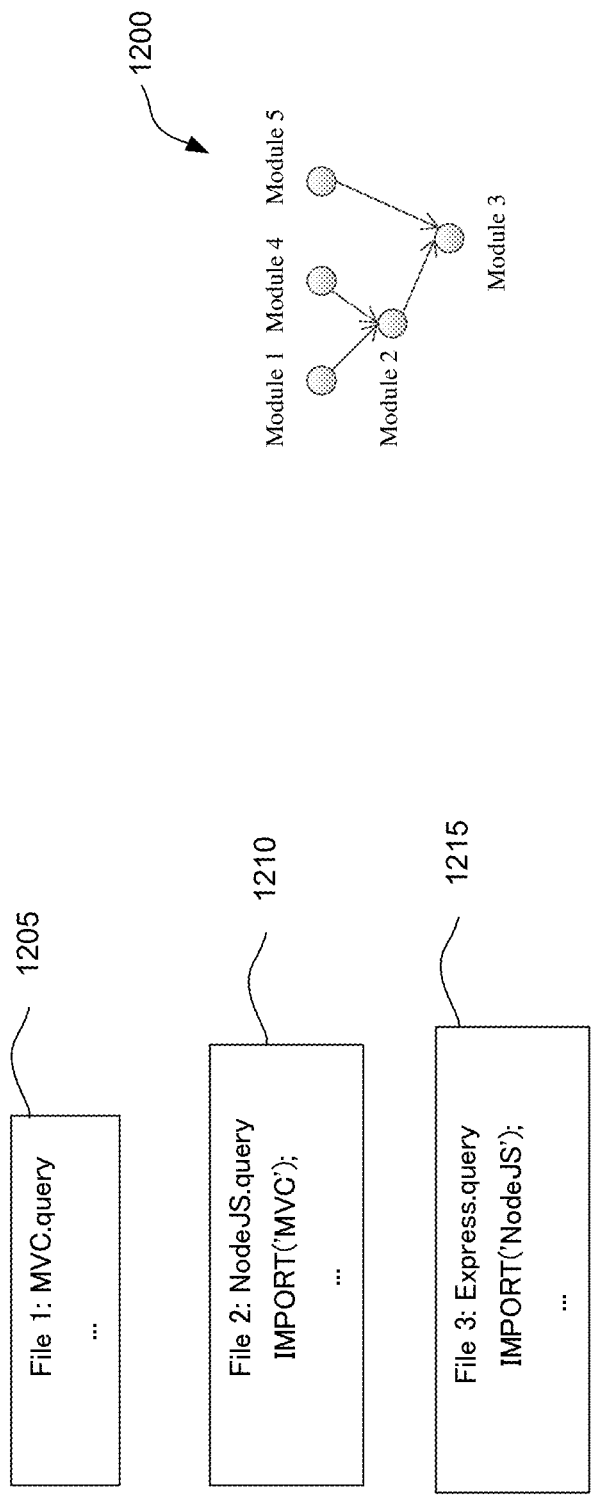
FIG. 12 shows an illustrative network 1200 of modules, in accordance with some embodiments.

FIG. 12 shows an illustrative network 1200 of modules, in accordance with some embodiments. The network 1220 may include a node Module 1 corresponding to a first query source file 1205, a node Module 2 corresponding to a second query source file 1210, and a node Module 3 corresponding to a third query source file 1215. The first query source file 1205 may include a framework model for an MVC architecture, the second query source file 1210 may include a framework model for a Node.js runtime environment, and the third query source file 1215 may include a framework model for an Express framework.

In example shown in FIG. 12, the first query source file 1205 may be imported into the second query source file 1210 via an IMPORT statement, so that queries in the Node.js framework model may make use of query definitions in the MVC framework model. Similarly, the second query source file 1210 may be imported into the third query source file 1215 via an IMPORT statement, so that queries in the Express framework model may use of query definitions in the Node.js framework model and/or the MVC framework model.

The inventors have recognized and appreciated that an organization of modules such as that shown in FIG. 12 may improve reusability of query definitions. However, it should be appreciated that aspects of the present disclosure are not limited to the use of modules for organizing query definitions.

F. Libraries and High-Level Queries

The inventors have recognized and appreciated that it may be beneficial to store certain commonly used query definitions in a library, so that these definitions may be accessed by simply loading the library. For example, query definitions for discovering and/or manipulating MVC components for web applications may be stored in a library, and definitions for discovering and/or manipulating MVC components for mobile apps (e.g., for an Android™ operating system and/or an iOS™ operating system) may be stored in the same or a different library.

FIG. 13 shows an illustrate set of nouns that may be used in a query language for accessing components in an MVC architecture, in accordance with some embodiments. In some embodiments, an MVC library may be provided that includes one or more predefined queries for discovering and/or manipulating MVC components. The MVC library may allow a user to use the nouns shown in FIG. 13 as high-level keywords in the query language.

In some embodiments, an MVC library may include one or more discovery queries that program an analysis engine to build MVC component models. For instance, an analysis engine may run the discovery queries on input program code and build the following illustrative model.

```
_model = {
    config: { ... },
    MVC: [
        { model: ..., controller: { action1: ..., action2: ... }, view: ...},
            model: ..., controller: { action1: ..., action2: ... }, view: ...},
    ]
}
```

FIG. 14 shows an illustrative hierarchy 1400 of MVC components, in accordance with some embodiments. For example, the hierarchy 1400 may represent MVC components from the above illustrative model, where two actions have been discovered for controller 1, but no action has been discovered for controller 2 yet.

In some embodiments, the nouns shown in FIG. 13 may be used to access MVC component models such as those shown in FIG. 14. Any suitable high-level language constructs may be used to query MVC nouns. For example, a query may use Xpath, Jquery, or CSS-like search, and may conveniently return a set of one or more elements.

As one example, the following high-level query written using an Xpath syntax may be used to select all routings implementing a method for a GET request.

//route[@method='get']

In some embodiments, this high-level query may be implemented as follows.

```
var res = [ ];
    for (var r of _model.route) {
        (if r['get'] != null)
            res.push[r];
    }
    return res;
```

As another example, the following high-level query written using an Xpath syntax may be used to select the last view in an application. A low-level implementation may be similar to the illustrative implementation shown above for //route[@method='get'].

/app/view[last( )]

As another example, the following high-level query written using an Xpath syntax may be used to select all views having a parent in an AST such that the parent has at least three child nodes. A low-level implementation may be based on how an Xpath interpreter processes such a query.

//view[@ast.parent.children.num>2]

In some embodiments, relationships between nouns may be expressed using verbs, where a verb may be syntactic sugar for a low-level implementation. As one example, a verb bound may have the following syntax.

<View(v)> bound <Controller(_)>

This statement may be implemented as follows.

EXISTS c IN_model.controller: _model.controller[c].view==v

As another example, a verb manipulate may have the following syntax.

<ViewResolver(_) manipulate <View(v)>

This statement may be implemented as follows.

EXISTS r IN_model.view[v]:_model.view[v] [r].resolver
!=null

As another example, a verb call may have the following syntax.

<Request(r)> call <Function(f)>

This statement may be implemented as follows.

_model.request[r].handler=f

As another example, a verb phrase set . . . to . . . may have the following syntax.

<Session> set <Field(f)> to <Value(v)>

This statement be implemented as follows.

_model.session[f]=v

The inventors have appreciated that, in some instances, nouns and verbs may be more convenient to use than the basic constructs of a query language. However, it should be appreciated that aspects of the present disclosure are not limited to the use of nouns or verbs to supplement the syntax of a query language. Furthermore, the techniques described here may be applied to software architectures other than MVC, as aspects of the present disclosure are not so limited.

IV. Model-Based Analysis of Software Applications

Scalable analysis of complex and large software applications has remained a challenge for a long time. An application may contain many components, use various external components (e.g., frameworks, libraries, middleware, etc.), and exhibit a complex architecture. The inventors have recognized and appreciated that there may be a tradeoff between scalability and accuracy. Accurate analysis often involve detailed modeling and rigorous checking, which may provide a deep understanding of semantics of an application, but may require significant time and effort (e.g., both for a human to formulate an analysis and for a machine to perform the analysis). Accordingly, it may be beneficial to provide analysis techniques with improved scalability and accuracy.

The inventors have recognized and appreciated that some solutions may sacrifice accuracy for scalability, while others may sacrifice scalability for accuracy. For example, syntactic analysis (e.g., based on grep) may be used to retrieve information from source code, and data flow analysis (e.g., based on bit propagation) may be used to understand how data is used by an application. The inventors have recognized and appreciated that these techniques may involve over-approximations, which may lead to false positives.

On the other hand, dynamic analysis techniques may apply fewer approximations (e.g. on relationships between components or on variables values) and therefore may be more accurate. However, the inventors have recognized and appreciated that dynamic analysis techniques may have low coverage (e.g., due to computational constraints), which may lead to false negatives.

The inventors have recognized and appreciated that, as more external components such as frameworks and libraries are used in software applications, and as software architectures become more complex, it may be more difficult to achieve both accuracy and scalability. Although a user may model and analyze various portions of an application separately, such an ad hoc approach may be not only tedious, but also unreliable, as interactions between the separately modeled portions may not be modeled adequately.

Accordingly, in some embodiments, techniques are provided for achieving a desirable balance between scalability and accuracy. For example, one or more pieces of information, including, but not limited to, software architecture (e.g., presence of one or more components and/or connections between components), program semantics, domain knowledge (e.g., regarding one or more frameworks, libraries, middleware, etc.), may be used to focus an analysis engine on one or more portions of an application that are relevant for a particular analysis. In some embodiments, such information may be explicitly recorded in one or more models.

In some embodiments, an analysis engine may be programmed to construct an application architecture model for a software application. The application architecture model may include models for individual components in an architecture. Given a certain property of interest, the analysis engine may select one or more relevant component models. The analysis engine may then check the property of interest against the selected component models. Using such a divide-and-conquer approach, the amount of information analyzed by the analysis engine may be reduced, while the risk of missing some relevant information may also be reduced because the component models are constructed based on knowledge of the application's architecture.

In some embodiments, an analysis engine may be programmed to perform incremental analysis as a software application evolves. For example, when a portion of source code is revised or added, the analysis engine may determine one or more component models that are affected, and may re-generate and/or re-analyze only the affected component models. This may significantly improve the analysis engine's response time and hence user acceptance.

In some embodiments, an analysis engine may be programmed to analyze an application adaptively. For instance, given a certain property of interest, the analysis engine may select one or more types of models that may be suitable for use in checking that property. The analysis engine may then construct and analyze one or more models of a selected type. In some embodiments, a model may be constructed by abstracting away information that is irrelevant for the property to be checked, thereby improving efficiency of the analysis engine.

Figure 15:
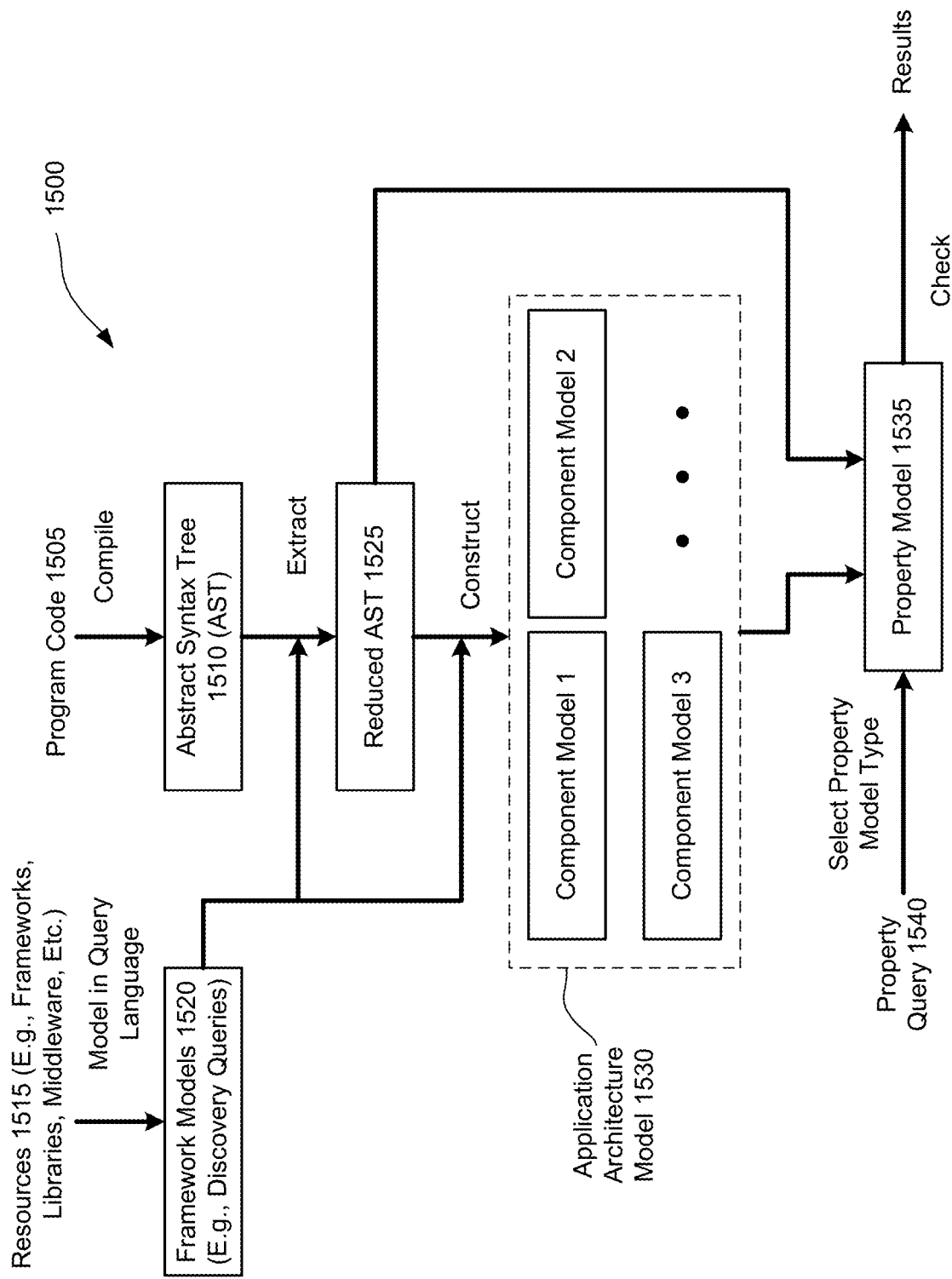
FIG. 15 shows an illustrative network 1500 of models that may be used to facilitate analysis of a software application, in accordance with some embodiments.

FIG. 15 shows an illustrative network 1500 of models that may be used to facilitate analysis of a software application, in accordance with some embodiments. For instance, the illustrative models shown in FIG. 15 may be used by an analysis engine (e.g., the illustrative analysis engine 105 shown in FIG. 1) to check input program code 1505 with respect to one or more properties of interest.

In the example shown in FIG. 15, the input program code 1505 may use one or more external components 1515. Examples of external components include, but are not limited to, frameworks, libraries, middleware, etc. Framework models 1520 for the external components 1515 may be built using a query language (e.g., via discovery queries), and may represent abstractions of the external components 1515 (e.g., for purposes of security analysis) and/or interactions between the external components 1515. In some embodiments, framework models may be indexed and stored in a database, and may be retrieved as needed.

In some embodiments, the input program code 1505 may be compiled into a suitable representation, such as an AST 1510. A reduced AST 1525 may then be constructed by applying one or more discovery queries from the framework models 1520 to extract relevant information from the AST 1510. For instance, the discovery queries may be used to identify and extract information in the AST 1510 that is relevant for security analysis, and the extracted information may be stored in the reduced AST 1525.

In the example shown in FIG. 15, the framework models 1520 and the reduced AST 1525 are used to construct an application architecture model 1530. The application architecture model 1530 may include high-level information such as software architecture (e.g., one or more components and/or connections between the components), program semantics, and/or domain knowledge (e.g., regarding one or more frameworks, libraries, middleware, etc.). For example, the application architecture model 1530 may include models for individual components in a software architecture, such as component model 1, component model 2, component model 3, etc. shown in FIG. 15.

In the example shown in FIG. 15, the network 1500 further includes a property model 1535. In some embodiments, an analysis engine may receive as input a property query 1540, which may capture semantics of a property of interest (e.g., a certain security property). Based on the property query 1540, the analysis engine may select an appropriate property model type and construct a property model of the selected type. For instance, the property model 1535 may be of the selected type, and may be derived by the analysis engine from the reduced AST 1525 and/or the application architecture model 1530. The analysis engine may then check the property model 1535 to determine if the property of interest is satisfied.

In some instances, the application architecture model 1530 may include sufficient high-level information to allow an analysis engine to determine if a certain property is satisfied, without analyzing low-level source code. This may allow the analysis engine to produce a result more quickly, thereby improving user experience. For example, values of configuration parameters may be extracted from input program code and may be stored in the application architecture model 1530 (e.g., in a table). When one or more such values are needed, an analysis engine may simply retrieve the one or more needed values from the application architecture model 1530, without having to look for such values in the input program code. However, it should be appreciated that aspects of the present disclosure are not limited to storing configuration parameter values in an application architecture model.

It should be appreciated that details of implementation are shown in FIG. 15 and described above solely for purposes of illustration, as aspects of the present disclosure are not limited to any particular manner of implementation. For instance, aspects of the present disclosure are not limited to the use of any reduced AST. In some embodiments, the AST 1510, instead of the reduced AST 1525, may be used to generate the application architecture model 1530.

FIG. 16 shows illustrative framework models 1600 and 1605, in accordance with some embodiments. The framework models 1600 and 1605 may be used by an analysis engine (e.g., the illustrative analysis engine 300 shown in FIG. 3) to generate an application architecture model (e.g., the illustrative application architecture model 310 shown in FIG. 3).

The inventors have recognized and appreciated that an external component used by a software application (e.g., framework, library, middleware, etc.) may include a large amount of code. For example, the Express framework's source code includes around 12,000 lines of JavaScript code. Therefore, it may be desirable to provide an abstraction that represents semantics of a resource in a concise way. Without such an abstraction, an analysis engine may be unable to analyze a resource quickly enough to deliver results in real time.

In some embodiments, a framework model may include a specification of relevant information about a resource. For example, a framework model may be defined using a query language having one or more constructs such as the illustrative constructs shown in FIG. 8 and discussed above.

In the example shown in FIG. 16, the framework models 1600 and 1605 represent semantics of the Express framework and the Express Session middleware, respectively. For instance, the framework model 1600 may reflect how routes are defined. Additionally, or alternatively, the framework model 1600 may define framework APIs. In some embodiments, the framework model 1600 may include about 100 lines of code, which is a significant reduction from the actual size of the Express framework (about 12,000 lines).

FIG. 16 shows an illustrative source code fragment 1610 that uses the Express framework and the Express Session middleware. In some embodiments, an analysis engine may be programmed to replace references to the Express framework and the Express Session middleware with references to the respective framework models, resulting in illustrative code fragment 1615. In this manner, framework models (e.g., the illustrative framework models 1600 and 1605 shown in FIG. 16) may be loaded, rather than source code of the Express framework and the Express Session middleware.

FIG. 16 also shows an illustrative source code fragment 1620 that uses an HTTP middleware and a Path middleware. The inventors have recognized and appreciated that some external components may not be relevant for a property of interest and therefore a model for such a resource need not be defined or loaded. This may reduce complexity and thereby improve performance of an analysis engine.

In some embodiments, one or more of the following properties may be of interest.
1. Is an httpOnly flag set to true in a session cookie?
2. In any route related to /users, is there a JavaScript injection?
3. In any route related to user signup, is a user name properly checked?

For these properties, session cookie and routes may be relevant, whereas other middleware such as HTTP and Path may not be relevant. Accordingly, in some embodiments, an analysis engine may be programmed to ignore references to the HTTP middleware and the Path middleware, as well as all subsequent code related to the HTTP middleware and the Path middleware. For instance, a mapping between types of properties and relevant middleware may be defined based on domain knowledge, and the analysis engine may be programmed to use the mapping to identify middleware that may be ignored.

Figure 17:
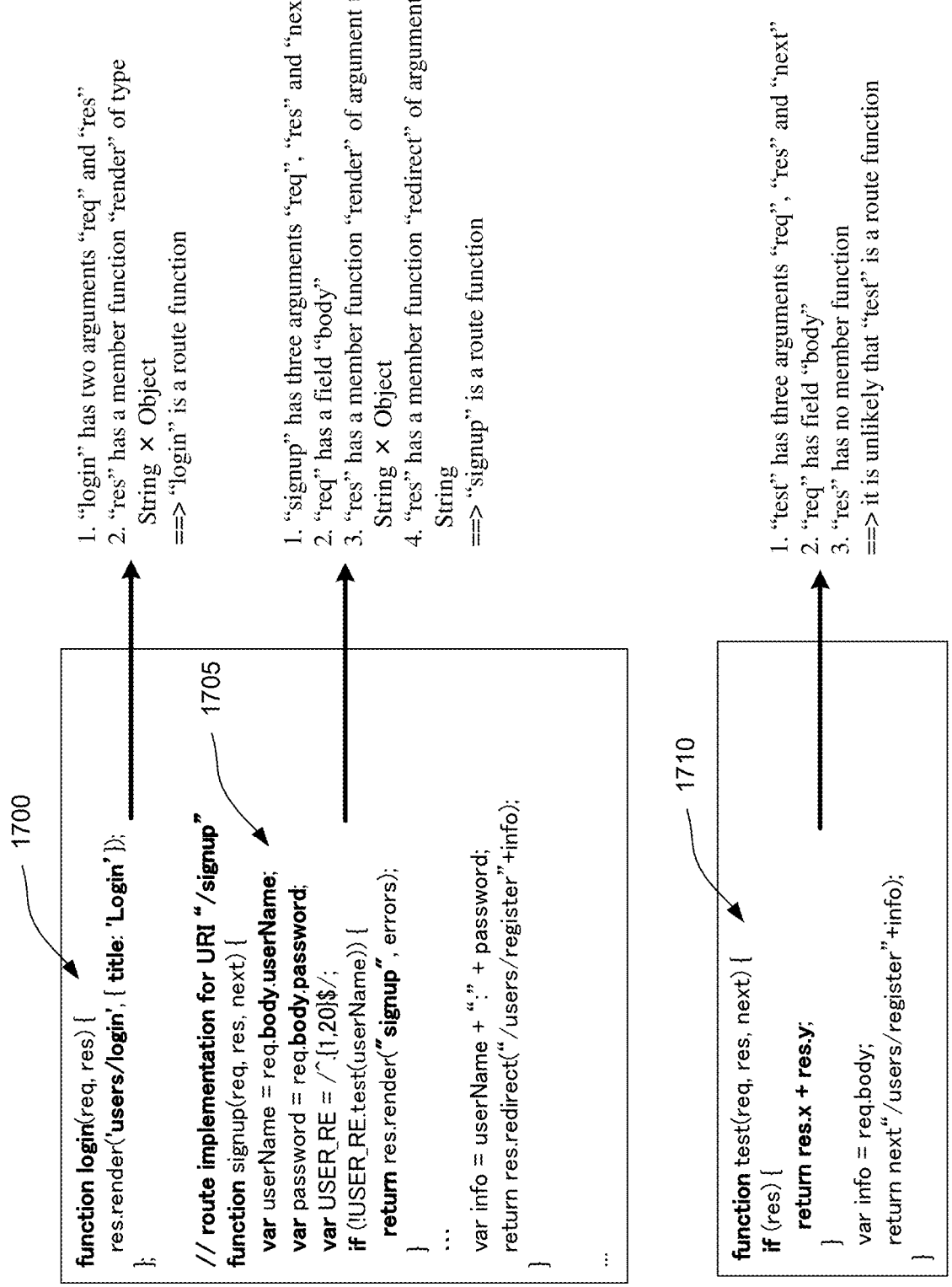
FIG. 17 illustrates an approach for programming an analysis engine to perform a field and type analysis, in accordance with some embodiments.

FIG. 17 illustrates an approach for programming an analysis engine to perform a field and type analysis, in accordance with some embodiments. For example, a query language may be used to program the analysis engine to perform a field and type analysis. In some embodiments, the query language may include one or more constructs such as the illustrative constructs shown in FIG. 8 and discussed above.

In some embodiments, a query language may be used to program an analysis engine to track names and types of fields in an object, and/or names and types of member functions in the object. These names and types may be matched with known signatures to infer a role of an object and/or a role of a function using the object.

For instance, a route function in the Express framework may have the following signature, and a query language may be used to program an analysis engine to determine if a function matches this signature.

function test(req, res, . . . )

The request object req may contain one or more of the following fields:
  body
  session
  etc.

The response object res may contain one or more of the following functions:
  render, with argument type String×Object
  session, with argument type String
  etc.

FIG. 17 shows illustrative function declarations 1700, 1705, and 1710. In some embodiments, the analysis engine may be programmed to determine that in the illustrative declaration 1700, a login function has two arguments, req and res, where the object res has a member function render with argument type String×Object. This may match the above signature, and the analysis engine may infer that login is likely a route function. Such an inference may be made even if there is not a perfect match. For instance, the analysis engine may infer that login is a route function even though the object req does not contain any field.

In some embodiments, the analysis engine may be programmed to determine that in the illustrative declaration 1705, a signup function has three arguments, req, res, and next, where req has a field body, and res has a member function render with argument type String×Object and a member function redirect of argument type String. This may match the above signature (even though the name redirect does not match the name session). Therefore, the analysis engine may infer that signup is a route function.

In some embodiments, the analysis engine may be programmed to determine that in the illustrative declaration 1710, a test function has three arguments, req, res, and next, where req has a field body, but res has no member function. Therefore, the analysis engine may determine it is unlikely that test is a route function.

Below are examples of queries that may be used to program an analysis engine to perform a field and type analysis (e.g., by performing syntactic pattern matching).

Looking for a function of the form $f(req^*, res^*)$.
    PERFORM   _model.routes['/UNKNOWN']['UNKNOWN']=$f$
    WHEN function $f(\$1, \$2)$
    WHERE $1.ast.name.startsWith('req') AND $2.ast.name.startsWith('res')
  Looking for a function with a first argument that has a member function session, body, or params, or a second argument that has a member function render or redirect.
    PERFORM   _model.routes['/UNKNOWN']['UNKNOWN']=$f$
    WHEN function $f(\$1, \$2)$
      {$1.session OR $1.body OR $1.params OR $2.render OR $2.redirect}

In some embodiments, an analysis engine may be programmed by a framework model to perform a field and type analysis to infer a role of an object and/or a role of a function using the object. The framework model may include one or more queries written in a query language. An inferred role for an object (or function) may be stored in an application architecture model in association with that object (or function). For instance, one or more discovered routes may be stored in a route model.

FIG. 18A shows an illustrative application 1800 and illustrative component models 1805 and 1810, in accordance with some embodiments. In this example, the application 1800 is written using the Express framework. In some embodiments, an analysis engine may be programmed to apply a framework model for the Express framework (e.g., the illustrative framework model 1600 shown in FIG. 16) to construct an application architecture model for the application 1800. The application architecture model may include one or more component models, such as the component models 1805 and 1810 shown in FIG. 18A. The component model 1805 may be a configuration model, and the component model 1810 may be a route model. For instance, in some embodiments, the component models 1805 and 1810 may be generated using the illustrative framework models 1600 and 1605 shown in FIG. 16. For example, the analysis engine may interpret the framework models 1600 and 1605 the source code 1800, thereby generating the components models 1805 and 1810 as output.

Figure 18B:
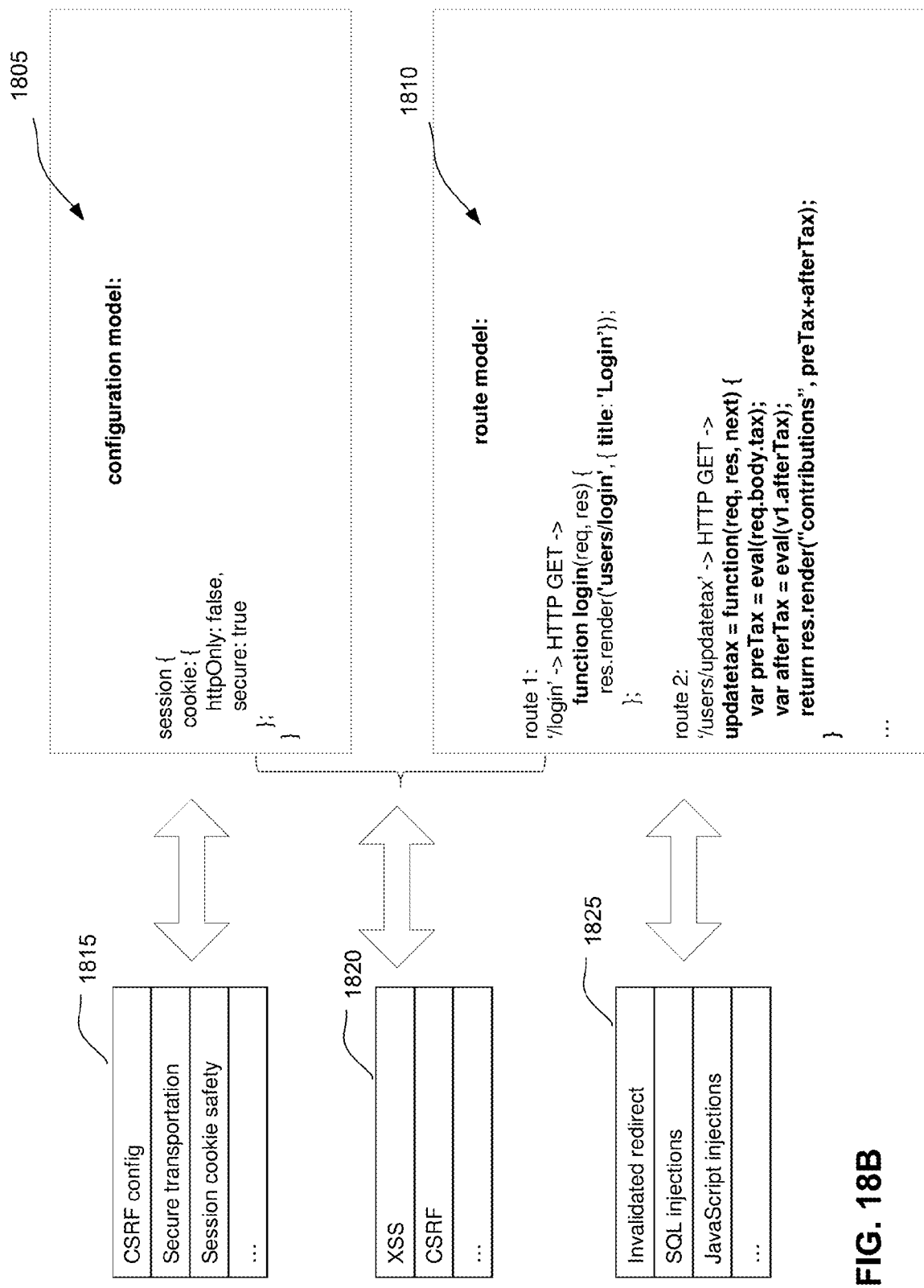
FIG. 18B shows illustrative groups 1815, 1820, and 1825 of security issues that may be checked by an analysis engine, in accordance with some embodiments.

FIG. 18B shows illustrative groups 1815, 1820, and 1825 of security issues that may be checked by an analysis engine, in accordance with some embodiments. The inventors have recognized and appreciated that by constructing models for individual components in an architecture, an analysis engine may be able to quickly identify relevant information to be analyzed and safely disregard irrelevant information. As one example, to check configuration-related issues 1815 such as Cross-Site Request Forgery (CSRF), configuration, secure transportation, session cookie safety, etc., the analysis engine may focus on the configuration model 1805. As another example, to check per-route issues 1825 such as invalidated redirect, SQL injections, JavaScript injections, etc., the analysis engine may focus on the route model 1810. By contrast, both the configuration model 1805 and the route model 1810 may be relevant for security issues in the group 1820, so the analysis engine may analyze both models when checking an issue from the group 1820. In some embodiments, a mapping between types of properties and respective components may be defined based on domain knowledge, and the analysis engine may be programmed to use the mapping to select one or more relevant components for a certain property to be checked. In this manner, the amount of information analyzed by the analysis engine may be reduced, which may improve the analysis engine's performance, while the risk of missing some relevant information may also be reduced because the component models are constructed based on knowledge of the application's architecture.

FIG. 19 shows a plurality of illustrative types of property models that may be used by an analysis engine to check a property of interest, in accordance with some embodiments. For instance, an analysis engine may be programmed to determine which one or more types of property models may be appropriate for use in checking a certain property of interest. Additionally, or alternatively, the analysis engine may be programmed to generate a property model of a selected type for a software application, and analyze the property model to determine whether the software application satisfies a property of interest.

The inventors have recognized and appreciated that different types of property models may be suitable for investigating different types of properties. As one example, a call graph may be used to capture function call relationships, whereas a data flow graph may be used to capture data dependence information (e.g., how a tainted value is propagated). As another example, a type system may be used to record types of variables and objects. As another example, an abstract numeric value estimation may be used to estimate possible values of numeric variables, whereas a string value estimation may be used to estimate possible values of string variables. As another example, a heap shape model may be used to capture pointer relationships between components in a heap. As another example, predicate abstraction may be used to capture relationships between values of variables. FIG. 20 shows an illustrative mapping from types of properties to types of property models, in accordance with some embodiments.

The inventors have further recognized and appreciated that different types of property models may offer different advantages. For instance, as shown in FIG. 19, property model types at the top (e.g., call graph, data graph, and type system) may be more abstract, and hence easier to compute but less precise. By contrast, property model types at the bottom (e.g., abstract numeric value estimation and string value estimation) may be more detailed, and hence more precise but harder to compute. Therefore, it may be beneficial to provide techniques for selecting an appropriate type of property model to achieve a desired balance between efficiency and accuracy.

Figure 21:
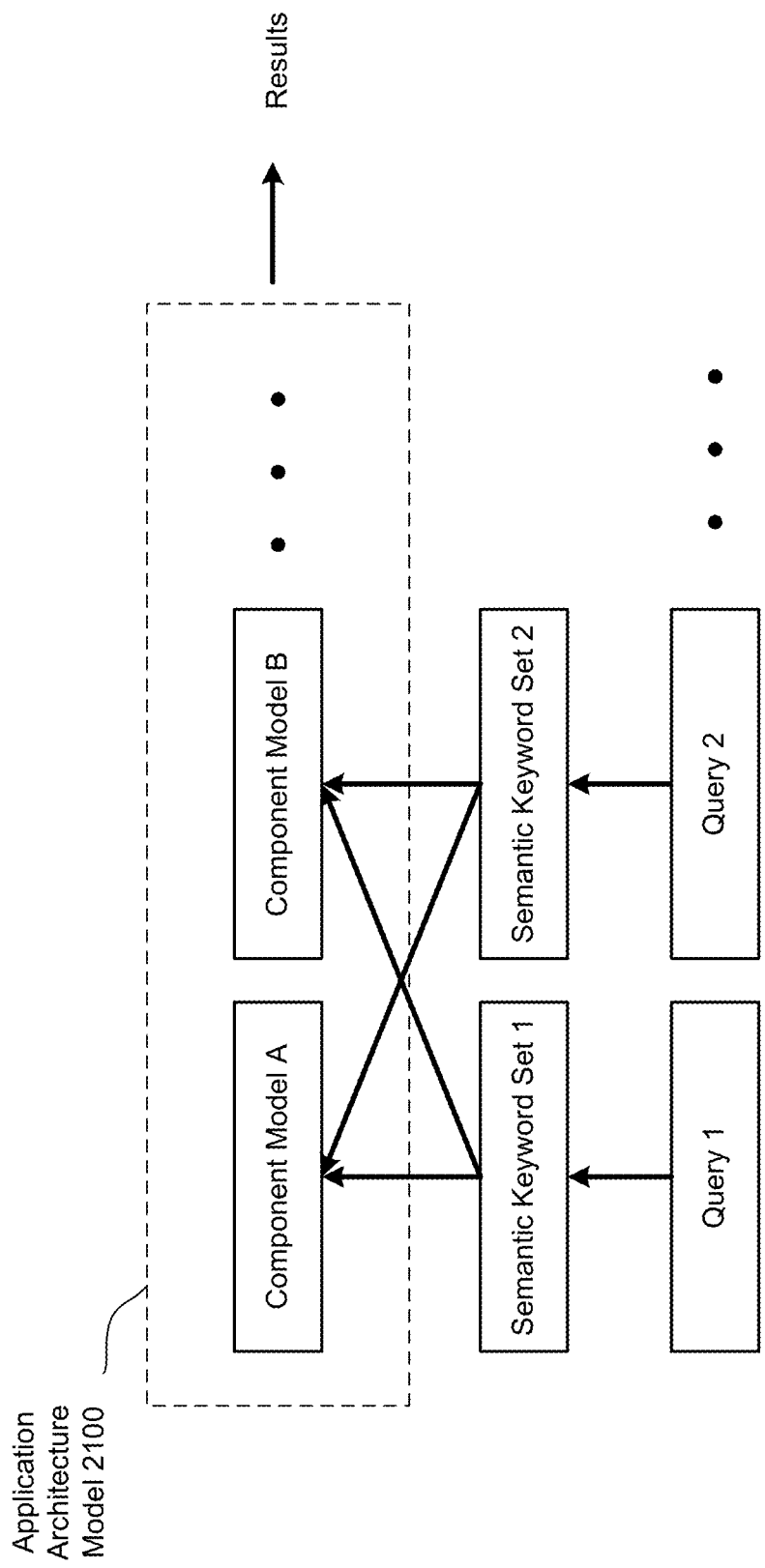
FIG. 21 shows an illustrative process for selecting one or more types of property models and using property models of the selected types to analyze a software application, in accordance with some embodiments.

FIG. 21 shows an illustrative process for selecting one or more property model types and using property models of the selected types to analyze a software application, in accordance with some embodiments. For example, the process shown in FIG. 21 may be used by an analysis engine (e.g., the illustrative analysis engine 105 shown in FIG. 1) to check input program code with respect to one or more properties of interest. For instance, a set of keywords may be retrieved from a property query. Then, for each keyword, a set of one or more relevant component models may be analyzed to generate one or more property models.

FIG. 21 shows an illustrative application architecture model 2100. In some embodiments, the application architecture model 2100 may be built by applying one or more framework models to input program code (e.g., as discussed above in connection with FIG. 15). The application architecture model 2100 may include high-level information such as software architecture (e.g., one or more components and/or connections between the components), program semantics, and/or domain knowledge (e.g., regarding one or more frameworks, libraries, middleware, etc.). For example, the application architecture model 2100 may include models for individual components in a software architecture, such as component model A and component model B shown in FIG. 21.

FIG. 21 also shows illustrative query 1 and illustrative query 2, which may each define a property to be checked. In some embodiments, an analysis engine may be programmed to select one or more property model types for a query such as query 1 or query 2. For instance, a query may be defined using a query language having one or more constructs such as the illustrative constructs shown in FIG. 8 and discussed above. The analysis engine may be programmed to parse the query based on a syntax of the query language, and to identify one or more semantic predicates from the query. In the example shown in FIG. 21, a semantic keyword set 1 is extracted from query 1, a semantic keyword set 2 is extracted from query 2, and so on.

In some embodiments, the analysis engine may select one or more property model types based on the identified semantic predicates. For instance, the analysis engine may use the identified semantic predicates to match the query to one of the illustrative property types shown in FIG. 20, and then use the illustrative mapping shown in FIG. 20 to determine an appropriate type of property model.

In some embodiments, the analysis engine may identify, for a component model in the application architecture model 2100 (e.g., the component model A or the component model B), one or more property model types for which the component model is relevant. For instance, the analysis engine may determine, for each query and each property model type associated with the query, whether the component model is relevant to the property model type (e.g., using one or more techniques described above in connection with FIGS. 18A-B). If the component model is determined to be relevant to the property model type, a property model of that type may be built based on that component model, and the property model may be analyzed. A result of that analysis may be output as a result for the query. In some embodiments, the analysis engine may group and/or prioritize analysis results from checking various property models. However, that is not required, as in some embodiments grouping and/or prioritization may be performed by a guidance engine, or may not be performed at all.

The inventors have recognized and appreciated that the illustrative process shown in FIG. 21 may be used advantageously to improve efficiency of an analysis engine. As one example, if a semantic predicate identified from a query is concerned with only types and Boolean/numeric values of some variables, then only type system analysis and numeric value estimation may be performed, and only for the variables involved.

The inventors have further recognized and appreciated that if a property is disproved using a more abstract model, then there may be no need to build and analyze a more detailed model. Accordingly, in some embodiments, an analysis engine may be program to perform analysis adaptively, for example, beginning with more abstract models and using more detailed models only as needed.

Figure 22:
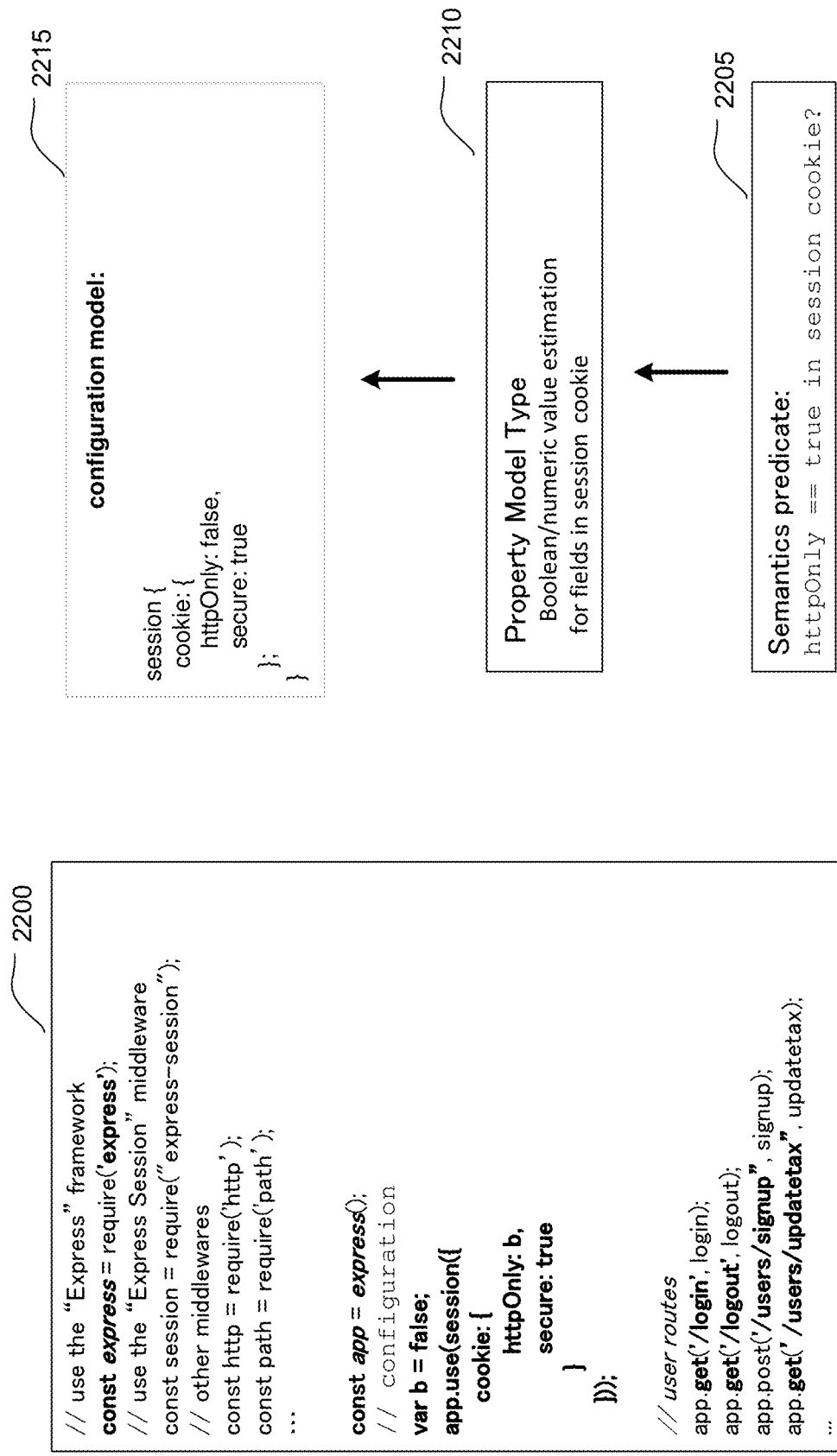
FIG. 22 shows an illustrative application 2200 and an illustrative analysis of the application 2200, in accordance with some embodiments.

FIG. 22 shows an illustrative application 2200 and an illustrative analysis of the application 2200, in accordance with some embodiments. In this example, the application 2200 is written using the Express framework. In some embodiments, an analysis engine may be programmed to apply a framework model for the Express framework (e.g., the illustrative framework model 1600 shown in FIG. 16) to construct an application architecture model for the application 2000. The application architecture model may include one or more component models, such as the illustrative configuration model 2215 shown in FIG. 22.

In some embodiments, a query may be specified based on the following property, and an analysis engine may be programmed to identify from the query a semantic predicate, such as the illustrative semantic predicate 2205 shown in FIG. 22.

Is an httpOnly flag set to true in a session cookie?
Illustrative semantic predicate in a query language:
model.setting.cookie.httpOnly==true In some embodiments, the analysis engine may select, based on the semantic predicate 2205, one or more types of property models. For example, the analysis engine may determine at 2210 (e.g., using one or more techniques described in connection with FIG. 21) that Boolean or numeric value estimation is to be performed for fields in session cookie. The analysis engine may further determine (e.g., using one or more techniques described in connection with FIG. 21) that the configuration model 2215 is relevant for Boolean or numeric value estimation for fields in session cookie. The analysis engine may then perform Boolean or numeric value estimation for fields in session cookie on the configuration model 2215 and output a result that the httpOnly flag is not set to true in session cookie.

Figure 23:
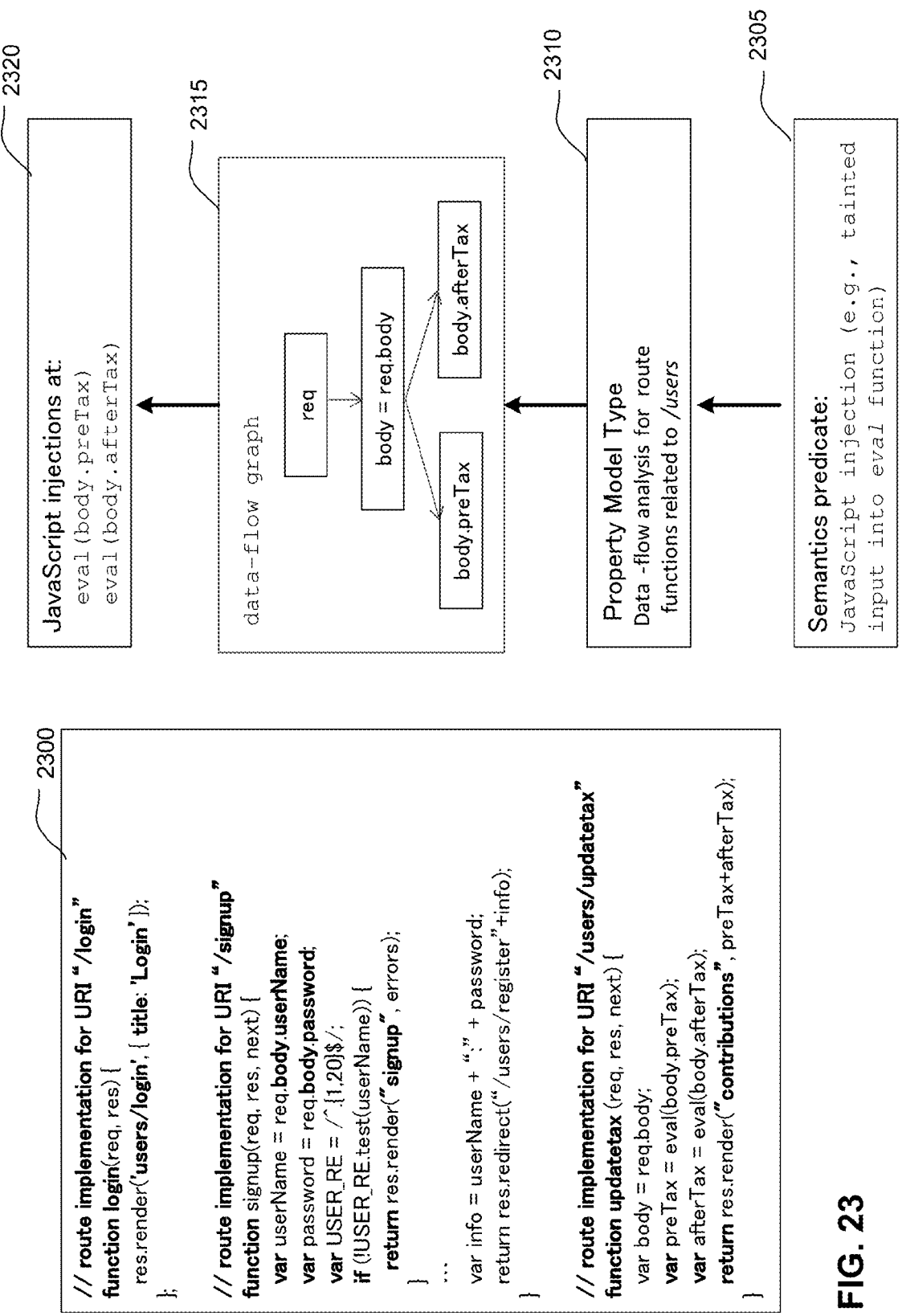
FIG. 23 shows illustrative program code 2300 and an illustrative analysis of the program code 2300, in accordance with some embodiments.

FIG. 23 shows illustrative program code 2300 and an illustrative analysis of the program code 2300, in accordance with some embodiments. The program code 2300 may be an implementation of the illustrative application 2200 shown in FIG. 22.

In some embodiments, a query may be specified based on the following property, and an analysis engine may be programmed to identify from the query a semantic predicate, such as the illustrative semantic predicate 2305 shown in FIG. 23.

In any route related to /users, is there a JavaScript injection?
Illustrative semantic predicate in a query language:
    <{eval($1)}> WHERE $1.tainted=true In some embodiments, the analysis engine may select, based on the semantic predicate 2305, one or more types of property models. For example, the analysis engine may determine at 2310 (e.g., using one or more techniques described in connection with FIG. 21) that data flow analysis is to be performed to calculate "tainted" values for route functions related to /users. The analysis engine may then analyze the program code 2300 (or an AST of the program code 2300) and construct a data flow graph 2315. Using the data flow graph 2315, the analysis engine may determine that JavaScript injections are present at eval(body.preTax) and eval(body.afterTax), and may output a result at 2320 accordingly.

Figure 24:
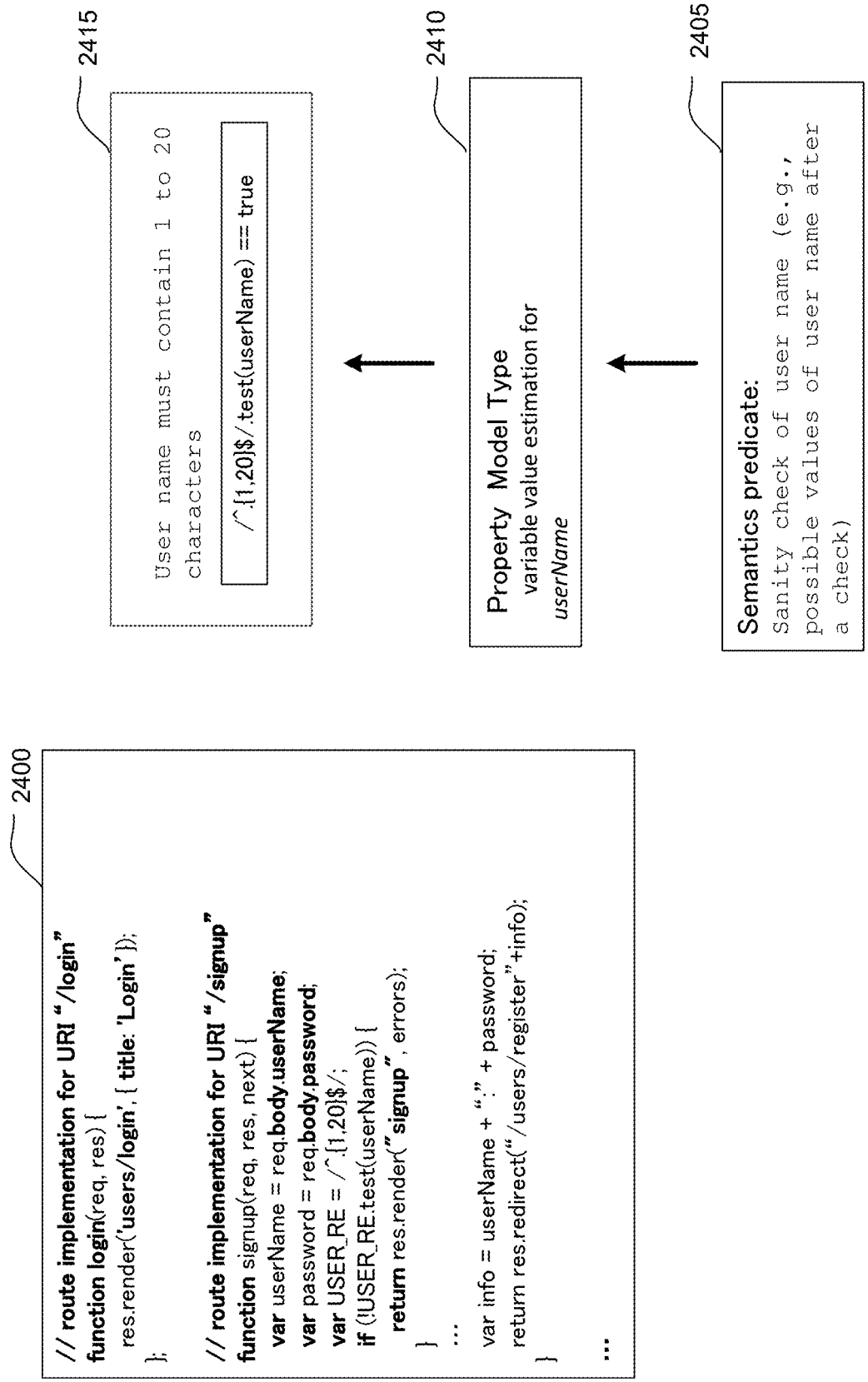
FIG. 24 shows illustrative program code 2400 and an illustrative analysis of the program code 2400, in accordance with some embodiments.

FIG. 24 shows illustrative program code 2400 and an illustrative analysis of the program code 2400, in accordance with some embodiments. The program code 2400 may be an implementation of the illustrative application 2200 shown in FIG. 22.

In some embodiments, a query may be specified based on the following property, and an analysis engine may be programmed to identify from the query a semantic predicate, such as the illustrative semantic predicate 2405 shown in FIG. 24.

In any route related to user signup, is a user name properly checked (e.g. can the user name be empty when the user name is used for redirecting a page)?
Illustrative semantic predicate in a query language:
    <{$0.redirect(_+$2)}> WHERE $2=' '.

In some embodiments, the analysis engine may select, based on the semantic predicate 2405, one or more types of property models. For example, the analysis engine may determine at 2410 (e.g., using one or more techniques described in connection with FIG. 21) that variable value estimation is to be performed for userName. The analysis engine may then perform variable value estimation for userName and output a result that the user name must contain one to 20 characters.

Figure 25:
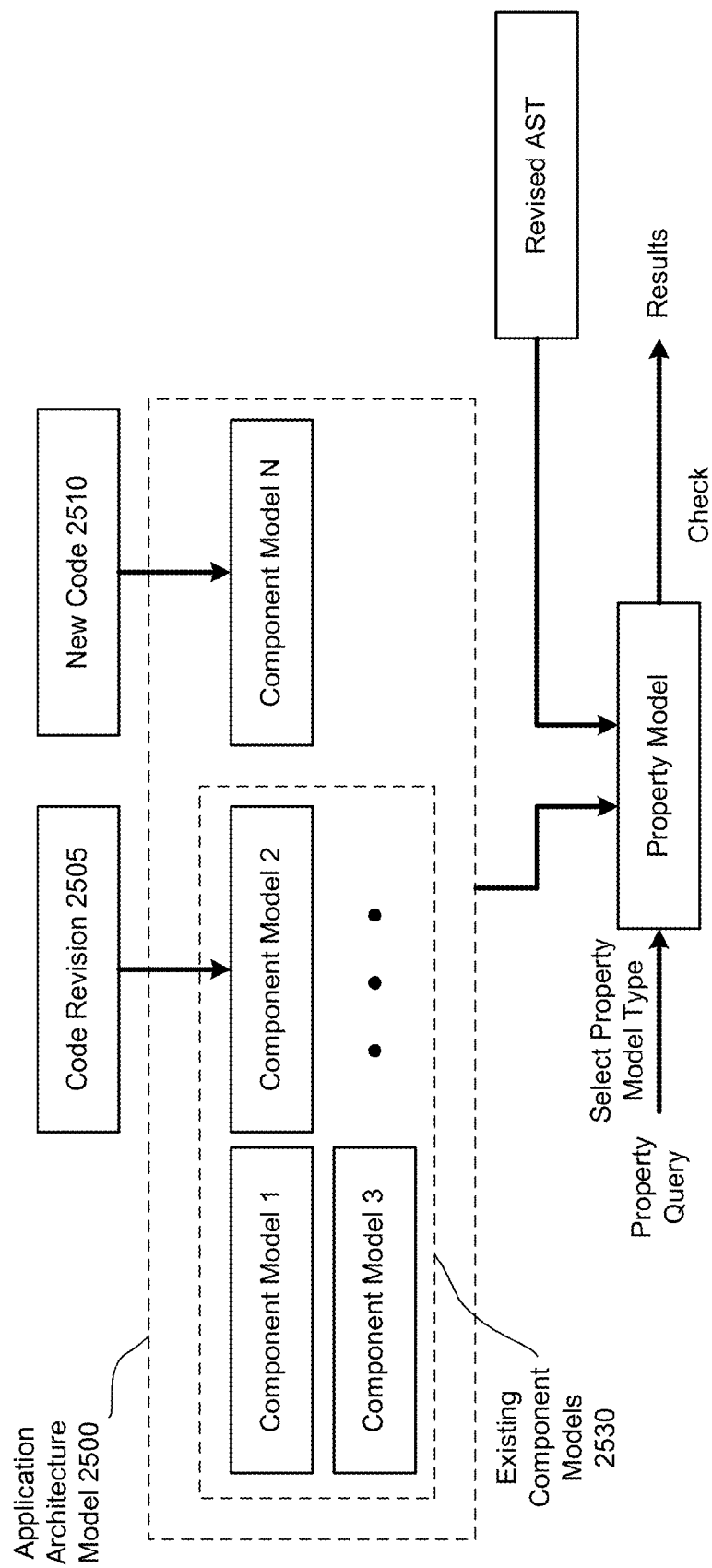
FIG. 25 shows an illustrative application architecture model 2500, in accordance with same embodiments.

FIG. 25 shows an illustrative application architecture model 2500, in accordance with same embodiments. Like the illustrative application architecture model 1530 shown in FIG. 15, the application architecture model 2500 in the example of FIG. 25 includes models for individual components in a software architecture. In some embodiments, the application architecture model 2500 may be an updated version of the application architecture model 1530. For example, an analysis engine may be programmed to update the application architecture model 1530 based on code changes to generate the application architecture model 2500.

The inventors have recognized and appreciated that when a developer modifies program code (e.g., by revising existing code and/or adding new code), regenerating the entire application architecture model 1530 may involve unnecessary computation. For example, the code changes may affect only some, but not all, of the component models in the application architecture model 1530. The inventors have recognized and appreciated that regenerating an unaffected component model may result in an identical component model. Accordingly, in some embodiments, techniques are provided for identifying one or more component models affected by certain changes and regenerating only the affected component models, which may improve an analysis engine's response time significantly.

The inventors have further recognized and appreciated that when a developer modifies program code (e.g., by revising existing code and/or adding new code), re-checking a property that is unaffected by the code changes may involve unnecessary computation. Accordingly, in some embodiments, techniques are provided for determining if a property is affected by certain code changes. An analysis engine may re-check only properties that are affected, which may also improve the analysis engine's response time significantly.

In the example shown in FIG. 25, code changes include code revision 2505. An analysis engine may be programmed to identify one or more component models (e.g., component model 2) that are affected by the code revision 2505. For example, if the code revision 2505 involves changes to a certain function only, and the function relates to a route definition, then the analysis engine may re-analyze only that route. Previous results relating to unchanged code may still be valid.

In the example shown in FIG. 25, code changes include new code 2510. In some embodiments, the analysis engine may be programmed to determine if the new code 2510 adds a component to the software application that is being analyzed. If it is determined that the new code 2510 adds a component to the software application that is being analyzed, the analysis engine may generate a new component model N, as shown in FIG. 25. The analysis engine may be further programmed to determine if any property is affected by the presence of the new component model N. If it is determined that a property is affected by the presence of the new component model N, the analysis engine may re-check that property.

In some embodiments, one or more incremental analysis techniques, such as those described in connection with FIG. 25, may be used to construct an application architecture model asynchronously. For example, different components in a software application may become available at different times. Whenever a new component becomes available, a new component model may be generated for that component, and affected properties may be re-checked. In this manner, an analysis engine may be able to return results quickly at each incremental step, rather than doing all of the computations after all components have become available.

FIG. 26A shows an illustrative application 2600 and an illustrative implementation 2605 of route functions in the application 2600, in accordance with some embodiments. In this example, the application 2600 includes a revision at 2610 to an assignment of a variable b, and the implementation 2605 includes revisions at 2615 to assignments of two variables, preTax and afterTax, as well as a new route function logout at 2620.

Figure 26B:
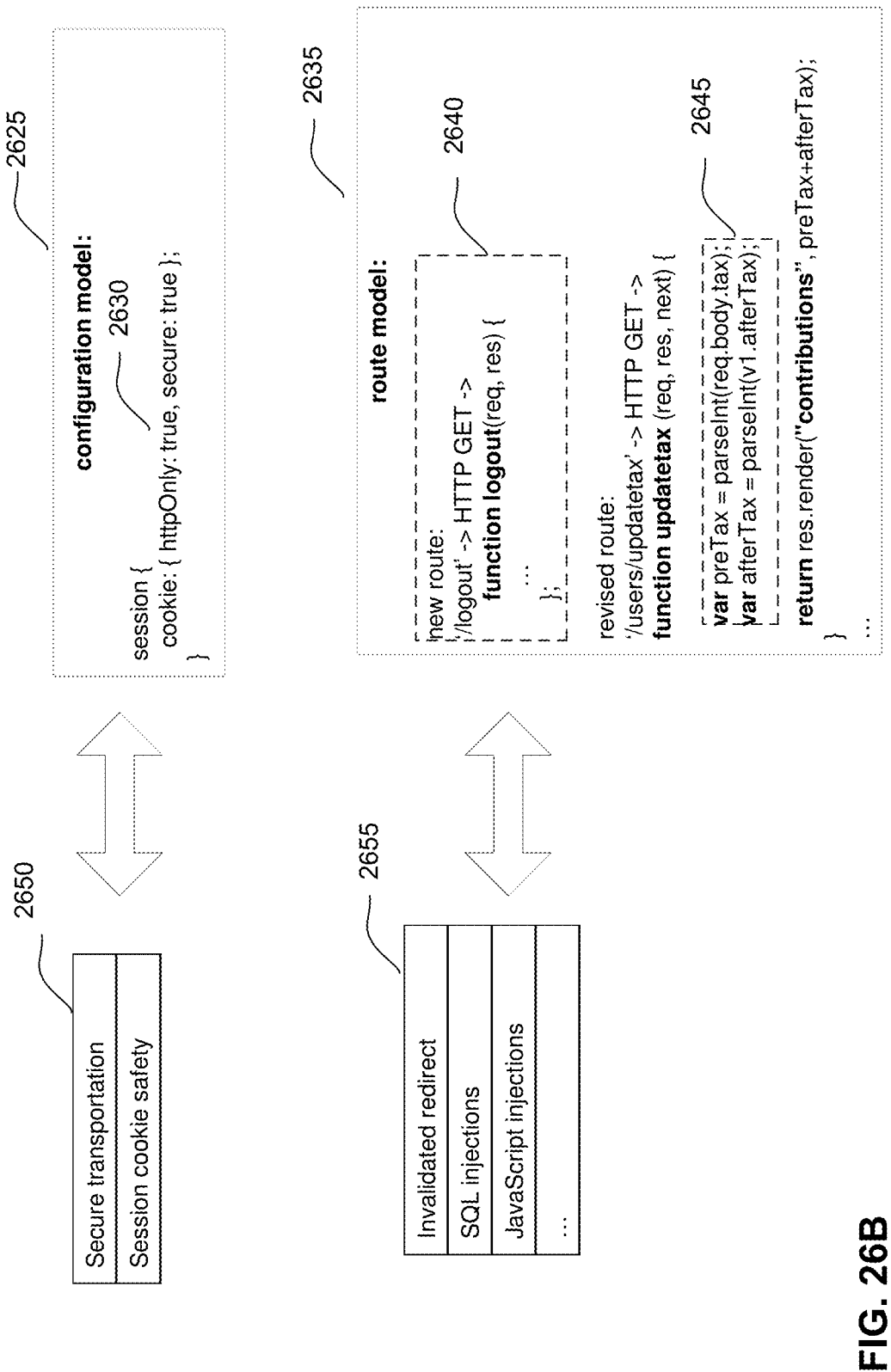
FIG. 26B shows an illustrative revised configuration model 2625 and an illustrative revised route model 2635, in accordance with some embodiments.

FIG. 26B shows an illustrative revised configuration model 2625 and an illustrative revised route model 2635, in accordance with some embodiments. For instance, an analysis engine may be programmed to determine that the revision at 2610 of FIG. 26A affects only the configuration model, and to generate the revised configuration model 2625 to reflect, at 2630, the revision to the assignment of the variable b. Furthermore, the analysis engine may be programmed to determine that only properties 2650 are affected by a change in the configuration model. Therefore, the analysis engine may check only the properties 2650 against the revised configuration model 2625.

Similarly, the analysis engine may be programmed to determine that the revisions at 2615 and 2620 of FIG. 26A affect only the route model, and to generate the revised route model 2635 to reflect, at 2640, the new route function logout and, at 2645, the revisions to the assignments of preTax and afterTax. Furthermore, the analysis engine may be programmed to determine that only properties 2655 are affected by a change in the route model. Therefore, the analysis engine may check only the properties 2655 against the revised route model 2635.

Figure 27:
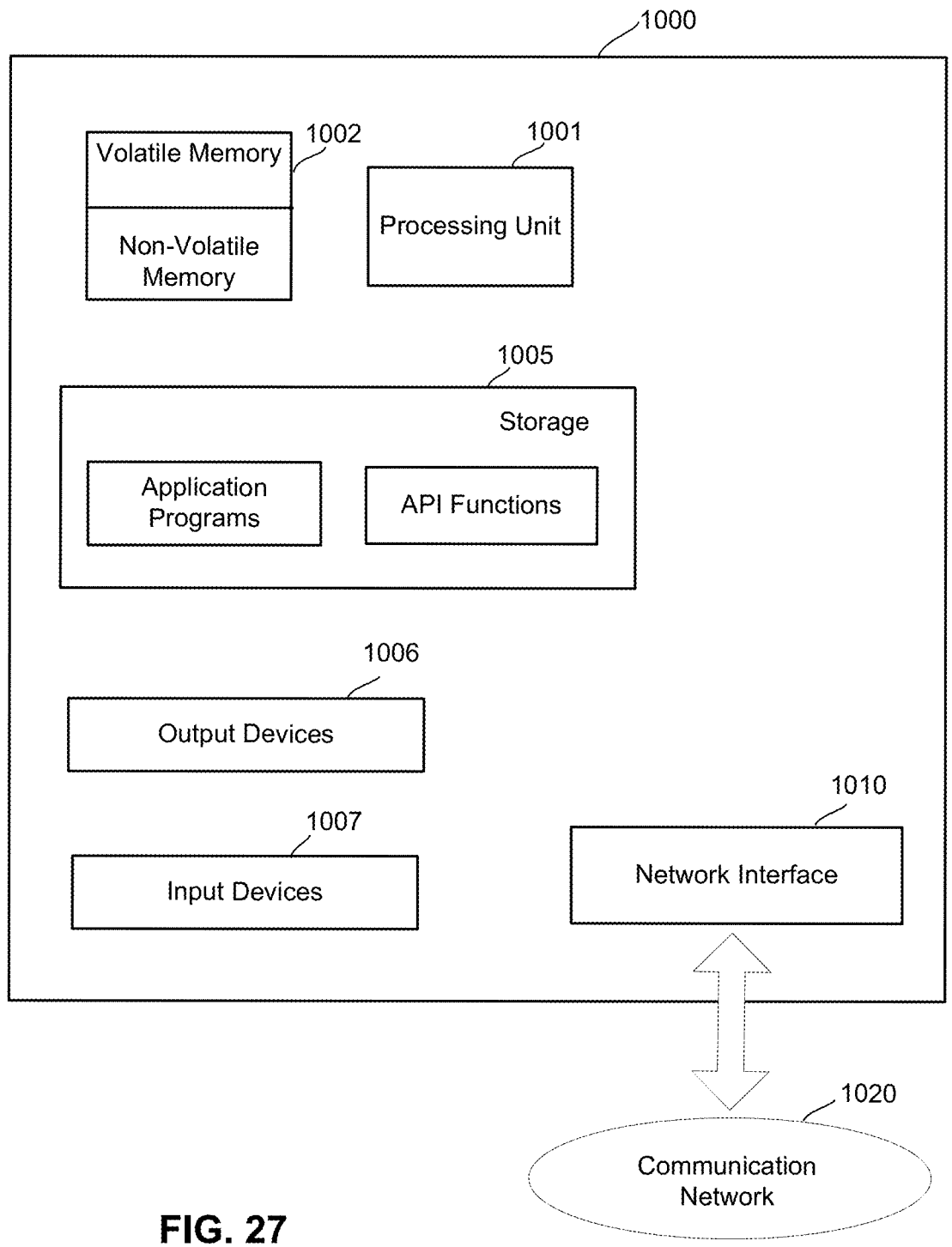
FIG. 27 shows, schematically, an illustrative computer 1000 on which any aspect of the present disclosure may be implemented.

FIG. 27 shows, schematically, an illustrative computer 1000 on which any aspect of the present disclosure may be implemented. In the embodiment shown in FIG. 27, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or external components used by application programs (e.g., software libraries), which may be loaded into the memory 1002.

The computer 1000 may have one or more input devices and/or output devices, such as devices 1006 and 1007 illustrated in FIG. 27. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 27, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A computer-implemented method for performing static analysis to detect security vulnerabilities in a software application, comprising:
   constructing, by at least one computer processor, a plurality of component models;
   reducing, by the at least one computer processor, the plurality of component models, based on whether any component model is relevant to a property to be checked, wherein the reducing comprises removing information;
   generating, by the at least one computer processor, a first application architecture model for the software application, wherein:
      the first application architecture model is generated based on a first version of code of the software application, and
      the first application architecture model comprises the reduced plurality of component models;
   comparing, by the at least one computer processor, a second version of the code against the first version of the code to determine a difference between the first version of the code and the second version of the code;
   identifying, by the at least one computer processor, based on the difference between the first version of the code and the second version of the code, an affected component model of the first application architecture model;
   generating, by the at least one computer processor, based on the first application architecture model and based on the second version of the code, a second application architecture model, wherein generating the second application architecture model comprises generating, by the at least one computer processor, an updated version of the affected component model;
   analyzing, by the at least one computer processor, the updated version of the affected component model to determine whether the property is satisfied;
   in response to determining that the property to be checked is affected by the difference between the first version of the code and the second version of the code, analyzing, by the at least one computer processor, a component model of the second application architecture model to determine whether the component model satisfies the property; and
   delivering, by the at least one computer processor, a result of at least one of the analyzing the updated version of the affected component model and the analyzing the component model of the second application, in real time when the code of the software application is added or modified.

2. The method of claim 1, wherein generating the second application architecture model further comprises adding a component model that is not in the first application architecture model.

3. The method of claim 1, wherein the component model of the second application architecture model comprises the updated version of the affected component model of the first application architecture model.

4. The method of claim 1, wherein the component model of the second application architecture model comprises a component model that is not in the first application architecture model.

5. A system comprising at least one processor coupled to a memory, the at least one processor configured to perform operations comprising:
   constructing a plurality of component models;
   reducing the plurality of component models, based on whether any component model is relevant to a property to be checked, wherein the reducing comprises removing information;
   generating a first application architecture model for a software application, wherein:
      the first application architecture model is generated based on a first version of code of the software application, and
      the first application architecture model comprises the reduced plurality of component models;
   comparing a second version of the code against the first version of the code to determine a difference between the first version of the code and the second version of the code;
   identifying, based on the difference between the first version of the code and the second version of the code, an affected component model of the first application architecture model;
   generating, based on the first application architecture model and based on the second version of the code, a second application architecture model, wherein generating the second application architecture model comprises generating an updated version of the affected component model;
   analyzing the updated version of the affected component model to determine whether the property is satisfied;
   in response to determining that the property to be checked is affected by the difference between the first version of the code and the second version of the code, analyzing a component model of the second application architecture model to determine whether the one or more component models of the second application architecture model satisfies the property; and
   delivering a result of at least one of the analyzing the updated version of the affected component model and the analyzing the component model of the second application, in real time when the code of the software application is added or modified.

6. The system of claim 5, wherein generating the second application architecture model further comprises adding a component model that is not in the first application architecture model.

7. The system of claim 5, wherein the component model of the second application architecture model comprises the updated version of the affected component model of the first application architecture model.

8. The system of claim 5, wherein the component model of the second application architecture model comprises a component model that is not in the first application architecture model.

9. At least one non-transitory computer-readable storage medium having stored thereon instructions which, when executed, program at least one processor to perform operations comprising:
- constructing a plurality of component models;
- reducing the plurality of component models, based on whether any component model is relevant to a property to be checked, wherein the reducing comprises removing information;
- generating a first application architecture model for a software application, wherein:
  - the first application architecture model is generated based on a first version of code of the software application, and
  - the first application architecture model comprises the reduced plurality of component models;
- comparing a second version of the code against the first version of the code to determine a difference between the first version of the code and the second version of the code;
- identifying, based on the difference between the first version of the code and the second version of the code, an affected component model of the first application architecture model;
- generating, based on the first application architecture model and based on the second version of the code, a second application architecture model, wherein generating the second application architecture model comprises generating an updated version of the at least one affected component model;
- analyzing the updated version of the affected component model to determine whether the property is satisfied;
- in response to determining that the property to be checked is affected by the difference between the first version of the code and the second version of the code, analyzing a component model of the second application architecture model to determine whether the one or more component models of the second application architecture model satisfies the property; and
- delivering a result of at least one of the analyzing the updated version of the affected component model and the analyzing the component model of the second application, in real time when the code of the software application is added or modified.

10. The at least one non-transitory computer-readable storage medium of claim 9, wherein generating the second application architecture model further comprises adding a component model that is not in the first application architecture model.

11. The at least one non-transitory computer-readable storage medium of claim 9, wherein the component model of the second application architecture model comprises the updated version of the affected component model of the first application architecture model.

12. The at least one non-transitory computer-readable storage medium of claim 9, wherein the component model of the second application architecture model comprises a component model that is not in the first application architecture model.

* * * * *